US012399023B2

(12) United States Patent
Sharifi

(10) Patent No.: US 12,399,023 B2
(45) Date of Patent: Aug. 26, 2025

(54) MESSAGE BASED NAVIGATIONAL ASSISTANCE

(71) Applicant: Google LLC, Mountain View, CA (US)

(72) Inventor: Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/784,221

(22) PCT Filed: May 7, 2021

(86) PCT No.: PCT/US2021/031382
§ 371 (c)(1),
(2) Date: Jun. 10, 2022

(87) PCT Pub. No.: WO2022/235274
PCT Pub. Date: Nov. 10, 2022

(65) Prior Publication Data
US 2024/0167834 A1    May 23, 2024

(51) Int. Cl.
*G01C 21/36* (2006.01)
*G01C 21/34* (2006.01)
*H04L 51/216* (2022.01)

(52) U.S. Cl.
CPC ......... *G01C 21/362* (2013.01); *G01C 21/343* (2013.01); *H04L 51/216* (2022.05)

(58) Field of Classification Search
CPC ... G01C 21/343; G01C 21/362; H04L 51/216; H04L 67/52; H04W 4/12; G06F 40/30; G06F 16/3326
See application file for complete search history.

(56) References Cited

U.S. PATENT DOCUMENTS 8,897,822 B2 * 11/2014 Martin ................. H04W 4/027
455/410
8,996,639 B1    3/2015 Faaborg et al.
(Continued)

FOREIGN PATENT DOCUMENTS

WO    WO-2018174840 A1 *    9/2018    ............. G01C 21/26

OTHER PUBLICATIONS

Daly et al., "Westland Row Why So Slow? Fusing Social Media and Linked Data Sources for Understanding Real-Time Traffic Conditions", In Proceedings of the 2013 international conference on Intelligent user interfaces, 2013, pp. 203-212.
(Continued)

*Primary Examiner* — Wilson W Tsui
(74) *Attorney, Agent, or Firm* — DORITY & MANNING P.A.

(57) ABSTRACT

Methods, systems, devices, and tangible non-transitory computer readable media for using incoming communications to generate suggestions for navigation. The disclosed technology can include accessing route data that includes information associated with navigation from a starting location to a destination. Based on the route data, one or more routes from the starting location to the destination can be determined. Message data including one or more messages to a user can be accessed. Based on the message data and one or more machine-learned models, at least one entity and objectives that are associated with the one or more messages can be determined. Based on the one or more routes, the at least one entity, and the objectives, suggestions associated with the one or more messages can be determined. Furthermore, output including indications associated with the suggestions directed to the user can be generated via a user interface.

19 Claims, 14 Drawing Sheets

(56) References Cited

U.S. PATENT DOCUMENTS

| | | | | |
|---|---|---|---|---|
| 10,339,925 | B1* | 7/2019 | Rastrow | H04M 3/42382 |
| 10,503,724 | B2 | 12/2019 | Ochiai et al. | |
| 2008/0171555 | A1* | 7/2008 | Oh | H04W 4/14 |
| | | | | 455/466 |
| 2012/0010805 | A1* | 1/2012 | Wilkerson | G06Q 10/109 |
| | | | | 701/538 |
| 2012/0016678 | A1* | 1/2012 | Gruber | G06F 16/3344 |
| | | | | 704/E21.001 |
| 2012/0166076 | A1* | 6/2012 | Hardy | G01C 21/3415 |
| | | | | 701/414 |
| 2015/0341290 | A1* | 11/2015 | Cherifi | H04W 4/12 |
| | | | | 709/206 |
| 2016/0163311 | A1* | 6/2016 | Crook | G10L 15/183 |
| | | | | 704/275 |
| 2018/0052909 | A1* | 2/2018 | Sharifi | G06F 16/3326 |
| 2020/0372796 | A1 | 11/2020 | Gajapala | |

OTHER PUBLICATIONS

International Search Report and Written Opinion for PCT/US2021/031382, mailed on Feb. 16, 2022, 17 pages.
International Preliminary Report on Patentability for Application No. PCT/US2021/031382, mailed Nov. 16, 2023, 11 pages.

* cited by examiner

MESSAGE BASED NAVIGATIONAL ASSISTANCE

PRIORITY CLAIM

This application is based upon and claims the right of priority under 35 U.S.C. § 371 to International Application No. PCT/US2021/031382 filed on May 7, 2021, which is incorporated by reference herein.

FIELD

The present disclosure relates generally to using incoming communications to assist user navigation. More particularly, the present disclosure relates to the use of computing systems that include machine-learning models configured to parse messages and generate relevant suggestions during navigation.

BACKGROUND

Various types of devices and applications can be used to facilitate user communication during navigation. Further, these devices and applications may capture information from different sources which are then provided to the user. Providing this information may create added complications and distractions for the user, since incoming communications may include relatively simple instructions that are provided in a less than organized manner.

Further, the information may be provided as the user performs some other task. For example, information such as updates regarding traffic conditions or road closures may be provided to a user while the user is driving. However, such updates are often of a simple and generic nature that is not directly relevant to the user. Further, a user may receive more personally directed messages while driving, however such messages may be hastily written and require careful reading to distinguish relevant information from irrelevant information. Additionally, such messages may divert the user's attention and involve complicated interactions at a time when the user's attention is otherwise occupied. As such, there exists a demand for more effective ways of leveraging computing systems to process incoming communications for a user during navigation.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of navigation. The computer-implemented method can include accessing, by a computing system comprising one or more processors, route data comprising information associated with navigation from a starting location to a destination. The computer-implemented method can include determining, by the computing system, based at least in part on the route data, one or more routes from the starting location to the destination. The computer-implemented method can include accessing, by the computing system, message data comprising one or more messages associated with a user. The computer-implemented method can include determining, by the computing system, based at least in part on the message data and one or more machine-learned models, at least one entity and one or more objectives that are associated with the one or more messages. The computer-implemented method can include generating, by the computing system, based at least in part on the one or more routes, the at least one entity, and the one or more objectives, one or more suggestions associated with the one or more messages. Furthermore, the operations can include generating, by the computing system, via a user interface, output comprising one or more indications directed to the user. The one or more indications can be associated with the one or more suggestions.

Another example aspect of the present disclosure is directed to one or more tangible non-transitory computer-readable media storing computer-readable instructions that when executed by one or more processors cause the one or more processors to perform operations. The operations can include accessing route data comprising information associated with navigation from a starting location to a destination. The operations can include determining, based at least in part on the route data, one or more routes from the starting location to the destination. The operations can include accessing message data comprising one or more messages associated with a user. The operations can include determining, based at least in part on the message data and one or more machine-learned models, at least one entity and one or more objectives that are associated with the one or more messages. The operations can include generating, based at least in part on the one or more routes, the at least one entity, and the one or more objectives, one or more suggestions associated with the one or more messages. Furthermore, the operations can include generating, via a user interface, output comprising one or more indications directed to the user. The one or more indications can be associated with the one or more suggestions.

Another example aspect of the present disclosure is directed to a computing system comprising: one or more processors; one or more non-transitory computer-readable media storing instructions that when executed by the one or more processors cause the one or more processors to perform operations. The operations can include accessing route data comprising information associated with navigation from a starting location to a destination. The operations can include determining, based at least in part on the route data, one or more routes from the starting location to the destination. The operations can include accessing message data comprising one or more messages associated with a user. The operations can include determining, based at least in part on the message data and one or more machine-learned models, at least one entity and one or more objectives that are associated with the one or more messages. The operations can include generating, based at least in part on the one or more routes, the at least one entity, and the one or more objectives, one or more suggestions associated with the one or more messages. Furthermore, the operations can include generating, via a user interface, output comprising one or more indications directed to the user. The one or more indications can be associated with the one or more suggestions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
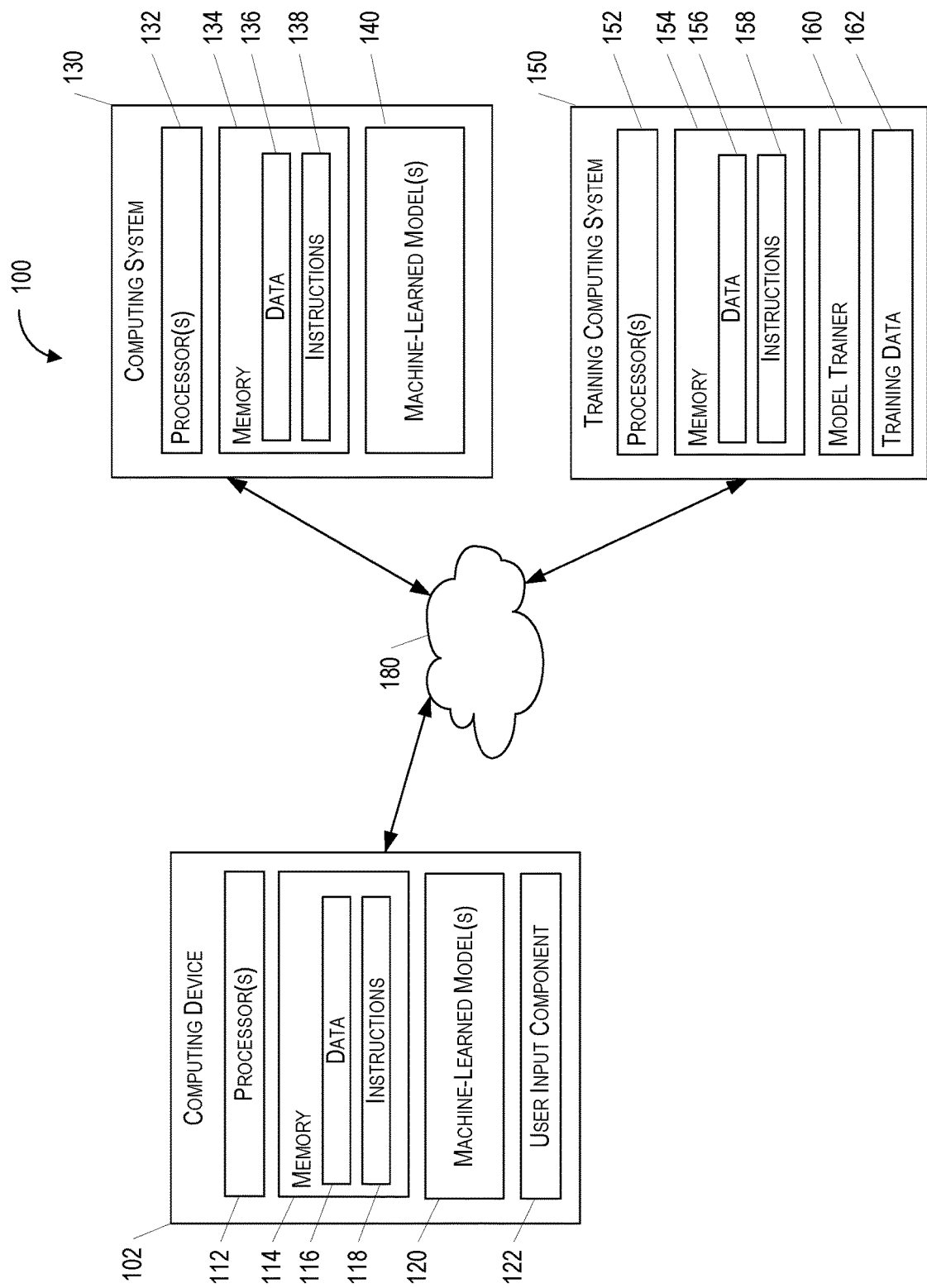
FIG. 1A depicts a block diagram of an example computing system that performs operations associated with message based generation of suggestions for navigation according to example embodiments of the present disclosure.

Reference numerals that are repeated across plural figures are intended to identify the same features in various implementations.

DETAILED DESCRIPTION

Example aspects of the present disclosure are directed to a computing system that can generate navigational suggestions based on communications that were sent to a user. In particular, the disclosed technology can generate suggestions for navigation based on an entity and objective that are determined from the contents of a message. Further, the disclosed technology can leverage the use of machine-learned models that employ natural language processing techniques to extract useful semantic and contextual information from messages in order to provide better suggestions for use in navigation.

For example, a user can receive a message from a friend, in which the message indicates that the friend would like to be picked up at a location that is different from a previously agreed upon pick-up location. A computing system of the disclosed technology can parse the message and determine that the message is from the user's friend and that the objective of the message is to request an update of the pick-up location. Further, based on the entity and the objective, the disclosed technology can generate a suggestion that proposes the new pick-up location to the user and offers the user the option of confirming that the user will pick-up their friend at the new pick-up location. Further, the disclosed technology can generate, via a user interface, an updated route that includes the new pick-up location and offer the updated route to the user. As such, the disclosed technology allows for improved navigation in which the user is offered relevant suggestions that are based on communications with the user. Furthermore, the disclosed technology allows the user to focus on navigational tasks without diverting their attention to other tasks such as reading and interpreting incoming communications. The disclosed technology therefore processes incoming communications in a way that provides enhanced driving safety due to the reduction in distractions for the user. Furthermore, the improved navigation achieved by offering suggestions based on communications with the user means that journeys can be shorter and more efficient (e.g., travelling more directly to an updated destination), thereby reducing journey time, fuel usage, and vehicle emissions.

By way of example, the disclosed technology can use a combination of one or more routes being navigated by a user (e.g., a user operating a navigation device such as a smartphone, an in-vehicle computing system, and/or in-vehicle navigation system) and messages (e.g., text messages) sent to the user, to generate suggestions relating to the message and/or the one or more routes being navigated by the user. Using some combination of machine-learned models and heuristics, an entity and objectives of the message can be determined and used to generate suggestions for the user. For example, the computing system can provide a suggested reply to a message via an audio system of a vehicle the user is using. In response to the suggestion, the user can instruct the computing system to perform operations based on the suggestions. For example, based on the suggestions, the user can confirm a route update or confirm that a reply to a message should be sent. As such, the disclosed technology facilitates a user's interaction with incoming communications and reduces some of the burden of manually changing routes or composing replies to messages.

In some embodiments, the disclosed technology can initiate a navigation session by providing a destination and an input to indicate that navigation should begin. The computing system can then use the current location of the user as the starting location for a route that is generated for the user. Further, the user's input can be analyzed in the context of previously received messages that may be useful in determining the user's intended destination. For example, the computing system may provide previous suggested routes to the user to facilitate the user's creation of a route.

The one or more routes can be determined on-device or remotely (e.g., on a remote server computing device) and can include turn-by-turn instructions to guide the user as the user travels. As the user travels, the computing system may receive messages via various messaging channels (e.g., SMS, instant messaging applications). For example, the computing system can operate a navigation application that includes a notification listener that detects incoming messages. Operation of the notification listener can be regulated on the basis of user content which can determine the applications the listener is approved to operate with and the times the notification listener is operational. For example, the user may also choose to only enable or restrict the listener when the user is alone in a vehicle, or in the presence of other trusted individuals. In this way, the user is provided with improved privacy and security.

When a message is received, the message can be processed by one or more on-device machine-learned models (e.g., a natural language understanding (NLU) model) that can be used to determine entities and/or objectives associated with the message. The NLU model (e.g., a deep neural network) can be configured and/or trained to detect and/or recognize various attributes including entities and/or objectives. The entities can include geographic locations, addresses, place names, and/or personal names. Further, some entities, including personal names may be implicit based on the sender of the message. The entities can also be mapped to locations and/or other types of entities. For example, a message indicating "CAN YOU PICK ME UP FROM WORK WHEN YOU'RE DONE?" may be associated with the work address of the sender of the message. The use of on-device machine-learned models means that sending message text to an external server can be avoided, thereby improving privacy and reducing communications network usage.

The objectives can include objectives associated with the message. For example, an objective could include a request to add a waypoint (e.g., a new pick-up location) or modify a destination. Further, the objectives may be associated with and/or include requests for information (e.g., the user's current location, estimated time of arrival, or status) that are not accompanied by a request to modify the one or more routes. For informational objectives, sub-objectives may more precisely capture the type of information being requested. For example, the importance of a message may determine whether a message is provided as purely informational (e.g., without a request for feedback or further action on the part of the user) or as requesting feedback from the user which requires a greater level of user involvement.

In some embodiments, the objectives can be associated with an objectively determined inference and/or prediction of one or more intents of the sender of the message. Further, determination of the objectives can be based at least in part on objective feedback from a user in which the user expressly indicates that their intents are objectively expressed in the form of certain key words and/or key phrases in a message.

In some embodiments, the measure of a message's importance may be based at least in part on whether the message is associated with the one or more routes being traversed by the user. For example, a message that includes a reference (e.g., "WHEN WILL YOU GET HERE?" which refers to how long the user will travel the route until arriving at the message sender) to a route being traversed by the user may be determined to be more important than a message that is not associated with the route being traversed by the user (e.g., "I GOT AN A ON MY EXAM!").

A triggering model (or one or more heuristics) may be used to process the output of the machine-learned model and can generate suggestions for the user. For objectives, the triggering model can use an extracted location entity that can be used as the parameter for a routing operation (e.g. an operation to update a destination or add a waypoint). Further, the objective can be based at least in part on a sub-objective type (e.g., message importance) and a current navigation status (e.g., the current location of the user).

Additionally, the objective may be determined to be purely informational in which case additional parameters are not required. Further, a threshold may be applied to the level of importance associated with a message and may also be based at least in part on whether there has been a determination of whether other messages from a particular sender should be propagated. The triggering model may use other contextual information and can for example, use portions of the message that was sent as part of a more succinct summary of the message that is easier for a user to assimilate. Based on the output of the triggering model, the disclosed technology can generate suggestions for the user. Depending on the types of objectives, the suggestions may be provided to the user without a request for feedback (e.g., purely informational suggestions) or accompanied by a request for feedback from the user (e.g., a request for confirmation of a suggested course of action).

When changes to navigation parameters are suggested, the user may be asked for confirmation. In response, the user can provide tactile feedback, gestural feedback, and/or spoken feedback confirming or refusing a suggestion. For example, the user can confirm a suggestion by tapping an interface element that is provided on a user interface of a navigational application. Upon receipt of confirmation by the user, route parameters (e.g., destination) can be updated. If the user refuses a suggestion, the route will remain unchanged. In either event, the user's feedback can be used as an input that can be used to train the machine-learning model and/or triggering model. In this way the disclosed technology can be more finely tuned to the preferences of each individual user.

Accordingly, the disclosed technology can improve the user experience by providing the user with suggestions for navigation that are based on incoming communications to the user. Further, the disclosed technology can assist a user in more effectively and/or safely performing the technical task of navigation from one location to another by means of a continued and/or guided human-machine interaction process in which messages are received and the disclosed technology generates suggestions to assist the user's navigation based on the received messages.

The disclosed technology can be implemented in a computing system (e.g., a navigation computing system) that is configured to access data, perform operations on the data (e.g., determine an entity and objectives associated with messages), and generate output including suggestions for navigation that may be directed to the user of the computing system. Further, the computing system can leverage one or more machine-learned models that have been configured to generate a variety of output including suggestions based on the entity and objectives associated with a received message. The computing system can be included in a vehicle (e.g., an in-vehicle navigation system) and/or as part of a system that includes a server computing device that receives data associated with a set of locations including a starting location (e.g., a user's current location) and a destination from a user's client computing device (e.g., a smart phone), performs operations based on the data and sends output including suggestions for navigation back to the client computing device. The client computing device can, for example, be configured to announce suggestions to a user and receive user feedback in response to the suggestions.

The computing system can access, receive, obtain, and/or retrieve data which can include route data. The route data can include information associated with one or more locations. Further, the route data can be associated with navigation from a starting location to destination. For example, the route data can include sets of latitudes, longitudes, and/or altitudes respectively associated with one or more locations along the one or more routes. Further, the route data can include information associated with any of the one or more locations along the one or more routes and/or within a predetermined area that includes the one or more routes. In some embodiments, the route data can include one or more requests for a navigation session associated with a user (e.g., the user that made the one or more requests) travelling from one location (e.g., the starting location) to another location (e.g., the destination), For example, the route data can include information associated with one or more maps of a geographic area that includes the starting location and/or the destination. For example, the route data can include one or more maps of a geographic area (e.g., a city or town) that indicates one or more locations of one or more roads (e.g., streets, highways, bus lanes, cycle paths, and/or foot paths), bodies of water (e.g., seas, lakes, rivers, and/or ponds), waterways (e.g., canals), buildings (e.g., office buildings, shopping centers, residential buildings, and/or houses), bridges, tunnels, overpasses, and/or underpasses.

Further, the route data can include information associated with one or more addresses and/or one or more tagged locations (e.g., locations that have been tagged by a user or other individuals) that are within the geographic area. For example, the one or more addresses and/or one or more tagged locations can include a user's office location, a user's home address, one or more restaurants that have been frequented by the user or a user's associates (e.g., family and/or friends), one or more stores (e.g., grocery stores, pharmacies, and/or shopping centers) that have been frequented by the user or a user's associates, and/or one or more schools (e.g., elementary schools, secondary schools, and/or post-secondary schools including universities) that are attended by the user or the user's associates.

The computing system can determine one or more routes from a starting location (e.g., the current location of a user) to a destination (e.g., a user selected location that the user will travel to). The one or more routes from the starting location to the destination can be determined based at least in part on the route data. For example, the computing system can determine one or more routes between the starting location and the destination by accessing the route data and determining one or more roads that permit the user to travel from the starting location to the destination. The one or more routes can include a single route (e.g., a route) from the starting location to a destination, any combination of routes that are contiguous and/or non-contiguous, overlapping routes (e.g., two routes that start at the same location and share the same path until one route ends and the other route continues beyond the end of the other route), and/or routes that are arranged in a sequence in which the end of one route marks the beginning of the next route until the last route ends at the destination.

In some embodiments, the one or more routes can be determined based at least in part on one or more route criteria including one or more distance constraints (e.g., maximum route distance) that constrain a distance of the one or more routes and/or one or more time constraints (e.g., maximum travel time) that constrain a travel time along the one or more routes.

The computing system can access, receive, obtain, and/or retrieve message data. The message data can include information associated with one or more messages associated with a user (e.g., a user of a computing device that is used for navigation). For example, the message data can include one or more messages received by the user, one or more messages received during a navigation session (e.g., a navigation session that was initiated by the user or a navigation session initiated by the computing system in response to some trigger event including starting a vehicle or opening a navigation application), and/or one or more messages based at least in part on user input received from the user. By way of further example, the computing system can access message data that was transmitted to a messaging application (e.g., an instant messaging application) that is operational on the computing system. Further, the computing system can access information including a message (e.g., a text message) that is included in the message data and/or metadata of the message data that can include a name of the sender of a message, a location of the sender of a message, and/or a time stamp associated with the time a message was sent.

In some embodiments, the message data can include information associated with at least one entity including a sender of the one or more messages, an individual associated with the sender of the one or more messages, and/or an individual associated with the recipient of the one or more messages. For example, the message data can include a telephone number and/or metadata that can be used to identify the sender of the one or more messages. Further, the message data can include metadata including information associated with one or more common contacts and/or shared relationships of the user and the sender of the one or more messages.

In some embodiments, the one or more messages can include one or more text messages. The one or more messages can, for example, be encoded using one or more standards including Unicode (e.g., UTF-8) and/or ASCII. Further, the one or more messages can include one or more short message service (SMS) messages that are communicated to the computing system using an instant-messaging and/or text-messaging application.

The computing system can determine, based at least in part on the message data (e.g., message data including the one or more messages) and/or the route data (e.g., route data including one or more locations the user plans to traverse), at least one entity and/or one or more objectives that are associated with the one or more messages. In some embodiments, determination of the at least one entity and/or the one or more objectives can be based at least in part on one or more machine-learned models. For example, the computing system can perform one or more operations including using the route data and/or the message data (e.g., the one or more messages included in the message data) as part of an input to one or more machine-learned models that are configured and/or trained to access the input, perform one or more operations on the input, and generate an output including the at least one entity and/or the one or more objectives.

The one or more objectives can include an inference with respect to one or more objectives the sender of the one or more messages of the message data is attempting to achieve.

The one or more objectives can be based at least in part on the identity of the at least one entity that is determined to have sent the one or more messages, the location from which the one or more messages were sent, one or more key words that are in the one or more messages, and/or one or more key phrases that are in the one or more messages. Further, the one or more objectives can include one or more sub-objectives that are associated with factors including the level of importance that is associated with a message.

In some embodiments, the one or more machine-learned models can be configured and/or trained to analyze and/or parse the message data and/or the route data in order to determine at least one entity associated with the message data (e.g., the sender of the message and/or any individuals mentioned within the message). For example, the at least one entity can include a personal name, a street address, and/or the name of a location.

Further, the one or more machine-learned models can be configured and/or trained to analyze and/or parse the message data to determine one or more objectives that may be present in the one or more messages. In some embodiments, the one or more objectives can include an objective to modify the one or more routes, an objective to provide information to the user, and/or an objective to request information from the user.

In some embodiments, the one or more machine-learned models can be configured to determine the at least one entity and/or the one or more objectives based at least in part on one or more natural language processing techniques. Further, the one or more machine-learned models can perform one or more natural language understanding operations to determine and/or extract semantic content from the one or more messages including at least one entity and/or one or more objectives that may be related to navigation (e.g., adding a waypoint to a route and/or changing a pick-up or drop-off location). Additionally, the one or more machine-learned models can use natural language processing techniques to determine the context of the one or more messages and capture nuances and meaning that are not expressly stated in the one or more messages. For example, the one or more machine-learned models can receive the message "PICK ME UP AT SEVEN" and use one or more natural language processing techniques to determine that "ME" refers to the sender of the message and "SEVEN" refers to a time of day and means seven (7) o'clock in the evening since the message was sent at three (3) o'clock in the afternoon.

In some embodiments, the same machine-learned model or set of machine-learned models can determine the at least one entity and/or the one or more objectives. In other embodiments, one machine-learned model and/or set of machine-learned models can determine the at least one entity and another machine-learned model or set of machine-learned models can determine the one or more objectives. Further, one or more machine-learned models can use any combination of the message data and/or the route data including one or more portions of the message data and/or the route data. For example, the one or more machine-learned models can use a set of locations extracted from the route data as the basis for determining one or more objectives extracted from the message data that may relate to a location within that set of locations.

The computing system can generate, based at least in part on the one or more routes, the route data, the message data, the at least one entity, and/or the one or more objectives, one or more suggestions associated with the one or more messages. For example, the computing system can perform one or more operations including using the at least one entity and/or the one or more objectives as part of an input to one or more machine-learned models that are configured and/or trained to receive the input, perform one or more operations on the input, and generate an output including the one or more suggestions. Further, the one or more machine-learned models can be configured and/or trained to analyze at least one entity and/or the one or more objectives in order to generate one or more suggestions (e.g., one or more suggestions that are relevant to the at least one entity and the one or more objectives). Further, the one or more machine-learned models can generate the one or more suggestions based at least in part on the determination and/or extraction of semantic content from the combination of the at least one entity and/or the one or more objectives. For example, the combination of the at least one entity being a family member of the user and the one or more objectives including changing a drop-off location can result in one or more suggestions including accepting an updated route that includes the new drop-off location.

In some embodiments, the one or more suggestions can be generated (by the computing system) using one or more heuristics. For example, the computing system can generate one or more suggestions based at least in part on parsing recognized portions of the one or more messages that are associated with previously determined suggestions. For example, if a message from a user's spouse states: "HOW MUCH LONGER?" a heuristic can access the route data to determine the estimated time of arrival at the location of the son and generate the suggestion "IN TEN MINUTES" as a suggested reply to send to the spouse.

The one or more suggestions can include one or more suggestions that are informational in nature and do not request feedback from the user. The one or more suggestions that do not request feedback can include a message summary that uses the at least one entity and the one or more objectives to generate a message summary that summarizes the one or more messages. The message summary may be a more succinct version of the message that may also include the identity (e.g., personal name and/or professional title) of the sender of the message and other information that can facilitate the user's understanding of the one or more messages.

In some embodiments, generating the one or more suggestions can include determining whether (or if) the at least one entity satisfies one or more relationship criteria. The one or more relationship criteria can define a relationship between the at least one entity (e.g., the sender of the one or more messages and/or an entity mentioned in the one or more messages) and the user. For example, the computing system can determine an identity of the at least one entity and compare that identity to a plurality of identities that were previously determined to be close associates of the user (e.g., family members, friends, and/or close colleagues). The one or more relationship criteria can include the at least one entity matching at least one of the plurality of identities that are close associates of the user. Further, the one or more relationship criteria can include the at least one entity matching at least one individual associated with the navigation session and/or route. The at least one individual associated with the navigation session and/or route can include at least one individual associated with a destination, a pick-up location, and/or a drop-off location. For example, if a user is a delivery person travelling on a route with a destination that is a drop-off location, the one or more suggestions may be associated with the one or more individuals that reside at the drop-off location.

Satisfying the one or more relationship criteria can include the at least one entity being associated with a high priority relationship group (e.g., an individual that is a family member or friend of the user), the at least one entity being an individual that has previously communicated with the user at a frequency that exceeds a communication frequency threshold (e.g., once a week), the at least one entity being an individual that has previously communicated with the user a total number of times that exceeds a communication quantity threshold (e.g., twenty (20) times in total), and/or the at least one entity being an individual that is associated with the one or more routes (e.g., an individual receiving a package from the user or an individual waiting to be picked-up by the user).

Further, the computing system can determine whether (or if) the one or more objectives are associated with modifying the one or more routes. The computing system can analyze the one or more objectives and determine whether any of the one or more objectives include and/or are associated with one or more key phrases and/or one or more key words associated with modifying the one or more routes. For example, phrases including "PICK ME UP AT . . . INSTEAD" in which the ellipsis (" . . . ") represent some location, can be determined to be associated with modifying the one or more routes. If the one or more objectives are associated with and/or include some combination of the one or more key phrases and/or one or more key words associated with modifying the one or more routes, the computing system can determine that the one or more objectives are associated with modifying the one or more routes.

In some embodiments, the one or more requests to modify the one or more routes can include a request to add at least one waypoint to the one or more routes, a request to modify a pick-up location, a request to modify a pick-up time, a request to modify a drop-off location, a request to modify a drop-off time, and/or a request to modify a destination of the one or more routes. Further, the computing system can use one or more natural language processing techniques to determine whether the one or more objectives include the one or more requests to modify the one or more routes. For example, the phrase "DON'T LEAVE THE PACKAGE IN FRONT DROP IT OFF AT THE BACK" can be determined to be associated with a request to modify a drop-off location for the delivery driver that received the message.

In response to the at least one entity satisfying the one or more relationship criteria and the one or more objectives being associated with the one or more requests to modify the one or more routes, the computing system can determine that the one or more suggestions are associated with modifying the one or more routes. For example, the computing system can determine that the one or more suggestions are associated with one or more requests to modify the one or more routes and generate one or more suggestions that are associated with modifying the one or more routes (e.g., a suggestion to change a pick-up location in accordance with the one or more objectives).

In some embodiments, generating the one or more suggestions can include determining a level of importance (e.g., some quantity or amount of importance) that is associated with the at least one entity and/or the one or more objectives. For example, the computing system can determine an identity of the at least one entity and compare that identity to a plurality of identities that are respectively associated with a plurality of importance scores. If the at least one entity matches at least one of the plurality of identities then the level of importance of the at least one entity will match the importance score. If the at least one entity does not match any of the plurality of identities then the at least one entity can be assigned a default level of importance (e.g., a low level of importance).

In response to the level of importance exceeding an importance threshold, the computing system can determine that the one or more suggestions shall include one or more requests for feedback from the user. The computing system can compare the level of importance to the importance threshold and if the level of importance exceeds the importance threshold the computing system can determine that the one or more suggestions that are generated will include one or more requests for feedback from the user. For example, the computing system can generate one or more suggestions that request feedback from a user (e.g., requesting the user to confirm a suggested update to a route). Further, if the level of importance exceeds the importance threshold, the computing system can generate one or more suggestions that include a request for feedback from the user in order to perform one or more operations associated with the one or more suggestions (e.g., a request asking the user to confirm the sending of a suggested reply to the sender of a message).

In some embodiments, the feedback from the user can be received via one or more user inputs (e.g., the user speaking) to an audio input component (e.g., a microphone) of the computing system that is configured to detect the user's voice and recognize what the user is saying. The computing system can then perform one or more operations (e.g., voice recognition operations) to parse the user's spoken words and determine whether the user's words comprise feedback provided by the user in response to a request for feedback (e.g., the computing system generating one or more suggestions associated with replying to one or more messages and including a request for feedback that asks the user whether the user would like to reply to the one or more messages with a suggested reply) included in output generated by the computing system.

In response to the level of importance not exceeding the importance threshold, the computing system can determine that the one or more suggestions shall not include one or more requests for feedback from the user. The computing system can compare the level of importance to the importance threshold and if the level of importance does not exceed the importance threshold the computing system can determine that the one or more suggestions that are generated will not include one or more requests for feedback from the user. For example, the computing system can generate one or more suggestions that are purely informational in nature and which do not request user feedback (e.g., a suggestion that provides information confirming that a person will be at a pick-up location at a mutually agreed upon time).

The one or more requests for feedback from the user can include a request for spoken feedback (e.g., generating synthetic speech that asks the user to verbally agree to the one or more suggestions), a request for haptic feedback (e.g., user interface elements generated on a display device of a computing system that ask the user to tap a suggestion interface element to confirm it), and/or a request for gesture feedback (e.g., generating synthetic speech that asks the user to nod to indicate their agreement with the one or more suggestions or shake their head to indicate their disagreement with the one or more suggestions).

In some embodiments, generating the one or more suggestions can include the computing system determining whether (or if) the one or more objectives are associated with a request for a travel status associated with the one or more routes. The travel status associated with the one or more routes can include a request for the location of the user (e.g., a request associated with a message asking the user "WHERE ARE YOU?"), a request for whether the user requires assistance (e.g., a request associated with a message asking the user "DO YOU NEED HELP?" or "ARE YOU LOST?"), and/or a request for an estimated time of arrival (ETA) at one or more locations (e.g., a location along the one or more routes including a pick-up location, a drop-off location, and/or the destination).

For example, the computing system can analyze the one or more objectives and determine whether any of the one or more objectives include and/or are associated with one or more key phrases and/or one or more key words associated with a request for an estimated time of arrival. For example, phrases including "WHEN WILL YOU ARRIVE?" or "HOW MUCH LONGER?" can be determined to be associated with a request for an estimated time of arrival. If the one or more objectives are associated with and/or include some combination of the one or more key phrases and/or one or more key words associated with requesting an estimated time of arrival, the computing system can determine that the one or more objectives are associated with requesting an estimated time of arrival.

In response to the one or more objectives being associated with the request for the travel status associated with the one or more routes, the computing system can determine that the one or more suggestions are associated with the request for the travel status associated with the one or more routes. For example, the computing system can determine that the one or more suggestions are associated with a request for travel status that includes requesting an estimated time of arrival. The computing system can then generate one or more suggestions that are associated with requesting the estimated time of arrival (e.g., a suggestion to send an estimated time of arrival in response to a message and/or a suggestion to confirm that the user will arrive at a pick-up location on time and in accordance with the estimated time of arrival).

In some embodiments, generating the one or more suggestions can include the computing system determining whether (or if) the one or more objectives are associated with a request for a pick-up or a request for a drop-off. The computing system can analyze the one or more objectives and determine whether any of the one or more objectives include and/or are associated with one or more key phrases and/or one or more key words associated with a request for a pick-up or a request for a drop-off. For example, phrases including "PLEASE PICK ME UP RIGHT NOW!" or "CAN YOU DROP THE PACKAGE OFF A BIT LATER?" can be determined to be associated with a request for a pick-up or a request for a drop-off. If the one or more objectives are associated with and/or include some combination of the one or more key phrases and/or one or more key words associated with a request for a pick-up or a request for a drop-off, the computing system can determine that the one or more objectives are associated with a request for a pick-up or a request for a drop-off.

In response to the one or more objectives being associated with the request for a pick-up or the request for a drop-off, the computing system can determine that the one or more suggestions shall be associated with the request for a pick-up or a request for a drop-off. For example, the computing system can determine that the one or more suggestions are associated with requesting a pick-up and generate one or more suggestions that are associated with requesting a pick-up (e.g., a suggestion to send a reply confirming that the user will pick up the person associated with requesting a pick-up).

The computing system can receive one or more user inputs that include a navigation request from the user. For example, the computing system can detect and/or monitor one or more inputs that are provided by a user. For example, the computing system can detect when a user speaks, interacts with a tactile user interface, and/or makes a gesture that is associated with a navigation request. The navigation request can include any request that is associated with navigation, generating a route (e.g., a route to a user selected location at which the user can pick-up someone or something, or drop-off someone or something), and/or modifying a route (e.g., update or change a currently planned route). Further, the navigation request can be in response to the one or more suggestions included in the output generated by the computing system. For example, the computing system can generate output including the one or more indications that are directed to the user and include a suggestion asking the user if the user would like to update the current route to include a new pick-up location waypoint. The user can then provide one or more inputs in the form of the spoken response "YES, UPDATE THE CURRENT ROUTE." Furthermore, the computing system can perform the update of the current route based at least in part on the user input (e.g., based at least in part on user input received in response to providing information to the user based on an incoming message), thereby providing a better human-machine interaction process and a safer driving experience.

The computing system can generate the route data based at least in part on the navigation request and/or the one or more user inputs. Further, the computing system can extract information from the navigation request and add that information to the route data. For example, a navigation request can include a request to pick-up the user's son from the son's elementary school. The computing system can then generate an updated route based on determination of the location of the son's elementary school and the user's current location. In some embodiments, the navigation request can be in the form of a spoken navigation request from the user that is then parsed by the computing system and encoded as a textual message that is included in the message data.

The at least one entity can be associated with a person (e.g., a person that the user knows or is associated with), a place (e.g., a location that the user has previously visited or that is associated with a person that the user knows), and/or an object (e.g., an object including a product or personal item that the user has previously used). In some embodiments, the at least one entity can be associated with one or more personal names, one or more geographic locations (e.g., one or more addresses and/or a neighborhood), one or more occupational titles (e.g., medical doctor, professor, and/or plumber), and/or one or more organizational names (e.g., the name of a school, business, office, and/or store).

In some embodiments, the one or more suggestions can include one or more turn-by-turn directions for the user to navigate the one or more routes. For example, the computing system can provide one or more suggestions to generate a suggested route to a location associated with the one or more messages (e.g., a drop-off location). Upon receiving feedback from the user in which the user confirms that the user intends to travel the suggested route, the computing system can then provide step by step or turn-by-turn directions to the location.

The computing system can generate output. Further, the output can be generated via a user interface. For example, the user interface can include a graphical user interface that is displayed on a display component of the computing system and is configured to receive one or more inputs (e.g., one or more touch inputs) from the user. By way of further example, the user interface can include an auditory user interface that uses one or more microphones to receive verbal commands from the user.

The output can include one or more indications. The one or more indications can be directed to the user. Further, the one or more indications can be associated with the one or more suggestions and/or the one or more messages. For example, the one or more indications can be addressed the user and can include the one or more suggestions to the user in a form that is intended to be perceptible and/or detectable by the user of the computing system. The computing system can include a display component (e.g., a display device of a vehicle driven by the user) that is visible to the user and can be used to display one or more portions of the one or more indications, the one or more messages, and/or the one or more suggestions. For example, the computing system can include a smartphone that includes a display component on which the user can view the output including the one or more indications; and/or an audio output component (e.g., loudspeakers) via which the user can hear the one or more suggestions that are announced via a user interface that generates a synthetic voice to provide the one or more suggestions. Further, the computing system can include an audio output component that can be used to generate the one or more suggestions in an auditory form that the user can listen to without having to look at a display device. For example, a user can hear the one or more suggestions generated by the computing system while driving a vehicle.

The one or more indications can include one or more visual indications and/or one or more aural indications. The one or more visual indications can include some combination of text and/or pictures that are displayed on a display device of the computing system in order to show the one or more suggestions. For example, the one or more suggestions can include a suggested reply to the one or more messages and the one or more visual indications can include a text version of the suggested reply that is displayed on a display component of the computing system.

The one or more aural indications can include a synthetic voice that is generated by the computing system to provide the one or more suggestions to the user. For example, the one or more aural indications can include a synthetic voice that reads the one or more suggestions to the user of computing device via an audio output component (e.g., loud speaker) of the computing system.

In some embodiments, the output can include a request for feedback from the user with respect to the one or more suggestions. For example, the computing system can generate one or more aural indications requesting that the user "CONFIRM AN UPDATED ROUTE" that was offered to the user as part of a suggestion based at least in part on a new route that was proposed in a message.

The computing system can access, receive, obtain, and/or retrieve feedback from the user. The feedback from the user can be accessed, received, obtained, and/or retrieved via a user interface of the computing system. For example, after generating output that includes one or more aural indications (e.g., synthetic speech generated via one or more speakers of the computing system) and/or one or more visual indications (e.g., text displayed on a display device of the computing system) that request feedback from the user, the computing system can receive the user's feedback (e.g., a spoken response by the user or a tactile user interaction with a user interface of the computing system).

The computing system can perform one or more operations based at least in part on the feedback from the user. For example, the computing system can parse spoken feedback from the user and determine whether the spoken feedback indicates that the user would like to confirm a suggested reply to a message or not send the suggested reply to the message.

In some embodiments, the one or more operations can include sending a response to a sender of the one or more messages, controlling one or more navigation systems, modifying the one or more routes, and/or training the one or more machine-learned models based at least in part on the feedback from the user.

Controlling one or more navigation systems can include controlling one or more notification systems that can generate one or more maps and/or one or more notifications associated with the one or more suggestions. For example, in response to receiving feedback from the user, the computing system can generate a map of the area that includes a suggested route. The map of the area can include one or more indications of the user's current location, the location of the destination, and/or one or more instructions (e.g., directions) associated with the one or more suggestions. Further, the one or more navigation systems can be used to generate one or more aural and/or one or more visual indications associated with the one or more suggestions (e.g., an estimated time of arrival at a pick-up location and/or a distance remaining to the pick-up location).

Training the one or more machine-learned models can include using the feedback from the user as part of a training input to the one or more machine-learned models. The training input to the one or more machine learned models can also include information associated with the route data, the message data, the at least one entity, the one or more objectives, and/or the one or more suggestions. Based at least in part on the training input, the one or more machine-learned models can perform one or more operations and generate an output including one or more suggestions. Over a plurality of iterations, a weighting of one or more parameters of the one or more machine-learned models can be adjusted based at least in part on the user's feedback. For example, positive user feedback that confirms a suggestion can result in greater weighting of the one or more parameters associated with the one or more suggestions that elicited the positive user feedback. By way of further example, negative user feedback that refuses a suggestion can result in a lower weighting of the one or more parameters associated with the one or more suggestions that elicited the negative user feedback. As a result, the one or more machine-learned models may generate more accurate and/or relevant suggestions over time as the one or more machine-learned models are configured and/or trained using the user's feedback.

The disclosed technology can include a computing system (e.g., a navigation computing system) that is configured to perform various operations associated with the generation of suggestions that can be used during navigation. In some embodiments, the computing system can be associated with various computing systems and/or computing devices that use, send, receive, and/or generate suggestions associated with navigation. Furthermore, the computing system can access, generate, process, modify, and/or communicate (e.g., send, and/or receive) data and/or information including data and/or information associated with suggestions for navigation including maps of one or more geographic regions through which a user is travelling or plans to travel to.

The computing system can include specialized hardware and/or software that enable the performance of one or more operations specific to the disclosed technology. The computing system can include one or more application specific integrated circuits that are configured to perform operations associated with accessing data including route data and/or message data, determining one or more routes for a user, determining at least one entity and/or one or more objectives associated with the one or more messages, generating one or more suggestions, and generating output including one or more indications associated with the one or more suggestions. By way of example, the computing system can be configured to control one or more navigation systems and/or communications systems of a vehicle based at least in part on the user's feedback to the suggestions generated by the computing system.

The systems, methods, devices, apparatuses, and computer-readable media (e.g., tangible non-transitory computer-readable media) in the disclosed technology can provide a variety of technical effects and benefits including an improvement in the generation of suggestions that can be used to assist a user to navigate. In particular, the disclosed technology may assist a user (e.g. a user of a navigation device) in performing technical tasks by means of a continued and/or guided human-machine interaction process in which suggestions are provided to a user on the basis of a user's current navigational route and communications (e.g., messages) that are sent to the user. Furthermore, the disclosed technology may provide additional benefits that improve the performance and effectiveness of the systems, devices, and/or services that implement the disclosed technology.

In particular, the disclosed technology can improve the efficiency with which resources are consumed by providing a user with messages and navigational suggestions that can improve the efficiency with which routes are traversed. Further, suggested routes can be provided to a user, thereby relieving the user of the burden of manually updating their route and allowing the user to proceed with minimal interruption. Additionally, waypoints can be added to a route in real-time as the user drives to a destination, thereby reducing energy consumption by reducing the need for the user to find a safe place to read the message, spend time reading the message, and consume additional energy by having to start again along a different route. This reduction in stop and go travel has the added benefit of reducing adverse environmental impacts. For example, a reduction in stop and go travel may result in a decrease in vehicle exhaust and other pollutants that result from suboptimal navigation.

Further, the disclosed technology can reduce the amount of bandwidth utilization over a network that results from long streams of back and forth messages between the user and a sender of a message. For example, instead of three or four messages being exchanged between a user and the sender of a message, the disclosed technology can leverage machine-learned models to rapidly provide relevant suggestions for a course of action, thereby significantly reducing the number of messages that need to be transmitted.

Further, the disclosed technology can provide the technical effect of improving the efficiency of tasks that require a user to follow a route or update the route in transit. In particular, delivery drivers and other service oriented drivers may more efficiently update their delivery routes based on suggestions relating to messages sent by customers. For example, a customer may send a text message indicating that the customer will not be at home to receive a package during a scheduled delivery window that requires the customer's signature. The disclosed technology may proactively suggest that the delivery driver update their route to bypass the customer's home and send the customer a message requesting an alternative delivery time. In this way, the driver can avoid needless travel to the customer's address and also quickly and efficiently update the drop-off time.

Further, the disclosed technology can provide an improvement to the overall performance of computing systems by continuously updating those computing systems in response to user feedback and monitoring of the types of suggestions that were acted upon by the user. For example, the quality of suggestions provided by the one or more machine-learned models can be improved based on user feedback that is used as a training input for one or more machine-learned models. This feedback based training input allows the one or more machine-learned models to be continuously updated and more finely tuned to the preferences of each individual user. For example, over time the one or more machine-learned models can be trained and/or updated to better parse certain linguistic idiosyncrasies based on messages that were previously sent to a user. User feedback based training can also result in the one or more machine-learned models generating more relevant suggestions, that are more context sensitive.

The disclosed technology can also improve the safety of navigating a vehicle by providing messages and/or navigational suggestions to the user, thereby reducing the user's need to divert their attention from the task of navigation (e.g., driving a vehicle) to look at or respond to messages. For example, the disclosed technology can provide a message indicating that a user's family member would like to change the time at which the family member is picked-up. Further, the disclosed technology can generate a suggested reply indicating that the user agrees with the request to change the pick-up time. The user then merely has to confirm the suggested course of action without diverting their attention by reading the message and composing a reply. In this way the user can operate a vehicle more safely by focusing their attention on their navigational task (e.g., driving) and paying less attention to monitoring communications and composing replies to those communications. As a result, the disclosed technology produces an effect that is based on objective parameters relating to more efficient multi-tasking and focusing of attention on mission critical tasks.

As such, the disclosed technology may assist the user of a navigation device or navigation system in more effectively performing a variety of tasks with the specific benefits of reduced resource consumption, reduced environmental impact, more efficient network utilization, improved routing efficiency, and general improvements to computing performance that result from effective use of machine-learned models. Further, any of the specific benefits provided to users can be used to improve the effectiveness of a wide variety of devices and services including navigational devices and/or navigational services that may proactively provide relevant navigational information and/or suggestions based on communications (e.g., messages) with a user. Accordingly, the improvements offered by the disclosed technology can result in tangible benefits to a variety of devices and/or systems including mechanical, electronic, and computing systems associated with navigation and/or providing suggestions associated with navigation.

With reference now to the Figures, example embodiments of the present disclosure will be discussed in further detail.

FIG. 1A depicts a block diagram of an example of a computing system that performs operations associated with message based generation of suggestions for navigation according to example embodiments of the present disclosure. The system 100 includes a computing device 102, a computing system 130, and a training computing system 150 that are communicatively coupled over a network 180.

The computing device 102 can include or be any type of computing device, including, for example, a personal computing device (e.g., laptop computing device or a desktop computing device), a mobile computing device (e.g., smartphone, or tablet), a gaming console or controller, a wearable computing device (e.g., a smart watch, a smart ring, smart glasses which can include one or more augmented reality features and/or virtual reality features), and/or an embedded computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more computer-readable mediums (e.g., tangible non-transitory computer-readable media), such as RAM, ROM, EEPROM, EPROM, flash memory devices, magnetic disks, etc., and combinations thereof. The memory 114 can store the data 116 and instructions 118 which are executed by the processor 112 to cause the computing device 102 to perform operations.

In some implementations, the computing device 102 can store or include one or more machine-learned models 120. For example, the one or more machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Examples of one or more machine-learned models 120 are discussed with reference to FIGS. 1A-15.

In some implementations, the one or more machine-learned models 120 can be received from the computing system 130 over network 180, stored in the memory 114, and then used or otherwise implemented by the one or more processors 112. In some implementations, the computing device 102 can implement multiple parallel instances of a single machine-learned model of the one or more machine-learned models 120 (e.g., to perform parallel operations to determine and/or generate suggestions for navigation based on received messages).

More particularly, the one or more machine-learned models 120 can be configured and/or trained to access data including route data and/or message data; determine one or more routes; determine at least one entity and/or one or more objectives; generate one or more suggestions; and generate output including one or more indications associated with the one or more suggestions.

Additionally, or alternatively, one or more machine-learned models 140 can be included in or otherwise stored and implemented by the computing system 130 that communicates with the computing device 102 according to a client-server relationship. For example, the one or more machine-learned models 140 can be implemented by the computing system 130 as a portion of a web service (e.g., a suggestion service that generates suggestions for navigation based on message data). Thus, one or more machine-learned models 120 can be stored and implemented at the computing device 102 and/or one or more machine-learned models 140 can be stored and implemented at the computing system 130.

The computing device 102 can also include one or more of the user input component 122 that is configured to receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more computer-readable mediums (e.g., tangible non-transitory computer-readable media), such as RAM, ROM, EEPROM, EPROM, flash memory devices, magnetic disks, etc., and combinations thereof. The memory 134 can store the data 136 and instructions 138 which are executed by the processor 132 to cause the computing system 130 to perform operations.

In some implementations, the computing system 130 includes or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include one or more machine-learned models 140. For example, the one or more machine-learned models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1A-15.

The computing device 102 and/or the computing system 130 can train the one or more machine-learned models 120 and/or the one or more machine-learned models 140 via interaction with the training computing system 150 that is communicatively coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more computer-readable mediums (e.g., tangible non-transitory computer-readable media), such as RAM, ROM, EEPROM, EPROM, flash memory devices, magnetic disks, etc., and combinations thereof. The memory 154 can store the data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the computing device 102 and/or the computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the one or more machine-learned models 120 and/or the one or more machine-learned models 140 based on a set of training data 162. The training data 162 can include, for example, one or more portions of text (e.g., one or more messages and/or one or more respective responses to the one or more messages), one or more images of one or more locations (e.g., images included in messages), one or more entities and/or one or more objectives associated with the message data and/or the route data, one or more suggestions associated with the at least one entity and/or one or more objectives.

In some implementations, if the user has provided consent, the training examples can be provided by the computing device 102. Thus, in such implementations, the one or more machine-learned models 120 provided to the computing device 102 can be trained by the training computing system 150 on user-specific data received from the computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can include image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. For example, the text and/or natural language data can respectively include one or more messages and/or one or more portions of audio (e.g., a spoken message) The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic objective output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can include speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is of higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A depicts a block diagram of an example computing system that performs operations associated with message based generation of suggestions for navigation according to example embodiments of the present disclosure. Other computing systems can be used as well. For example, in some implementations, the computing device 102 can include the model trainer 160 and the training data 162. In such implementations, the one or more machine-learned models 120 can be both trained and used locally at the computing device 102. In some of such implementations, the computing device 102 can implement the model trainer 160 to personalize the one or more machine-learned models 120 based on user-specific data.

Figure 1B:
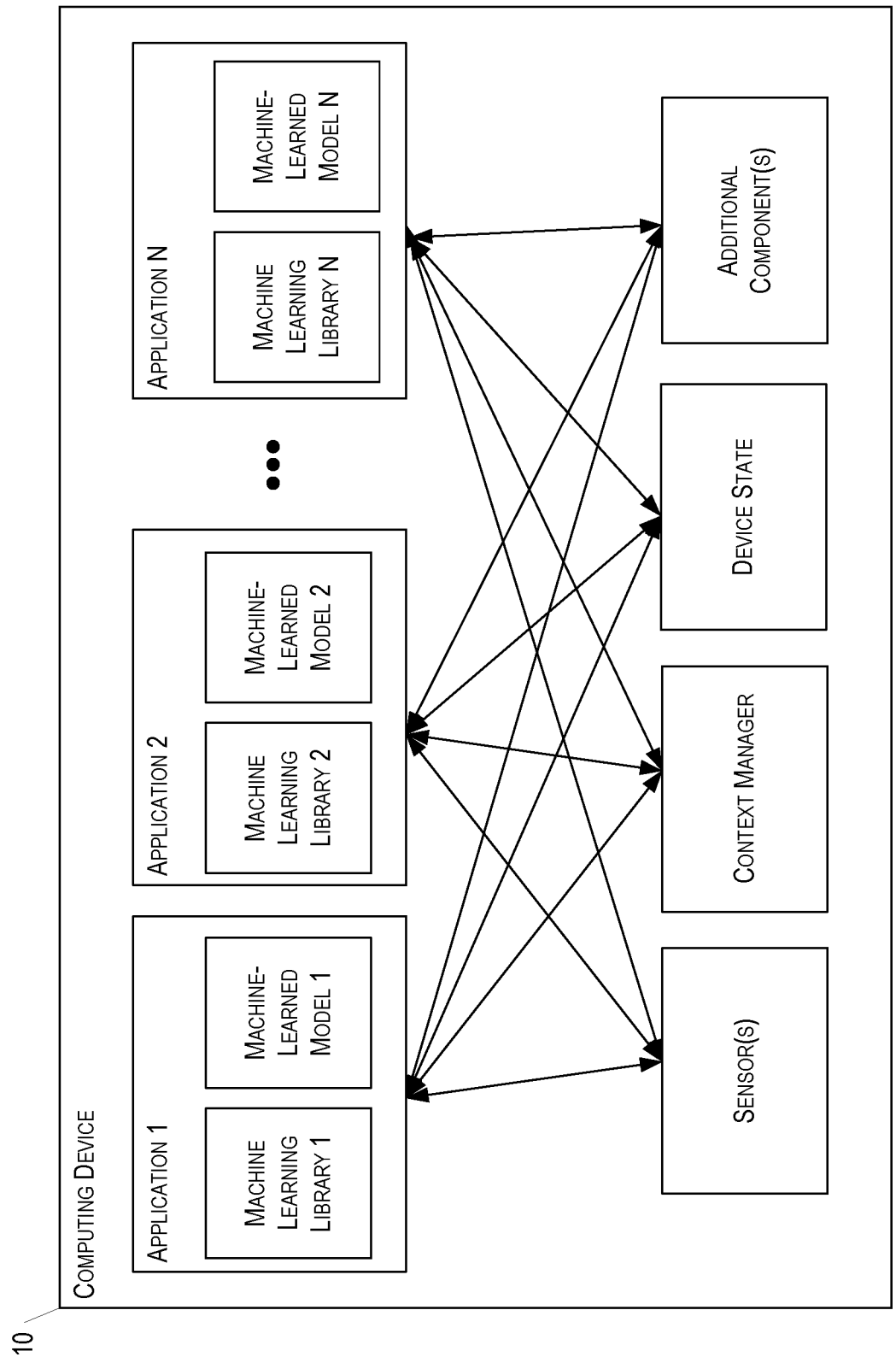
FIG. 1B depicts a block diagram of an example of a computing device that performs operations associated with message based generation of suggestions for navigation according to example embodiments of the present disclosure.

FIG. 1B depicts a block diagram of an example of a computing device that performs operations associated with message based generation of suggestions for navigation according to example embodiments of the present disclosure. The computing device 10 can include a user computing device or a server computing device.

The computing device 10 includes a number of applications (e.g., applications 1 through N). Each application contains its own machine learning library and machine-learned model(s). For example, each application can include a machine-learned model. Example applications include a navigation application, a messaging application (e.g., a text messaging application), a routing application, a mapping application, an email application, a dictation application, a virtual keyboard application, and/or a browser application.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
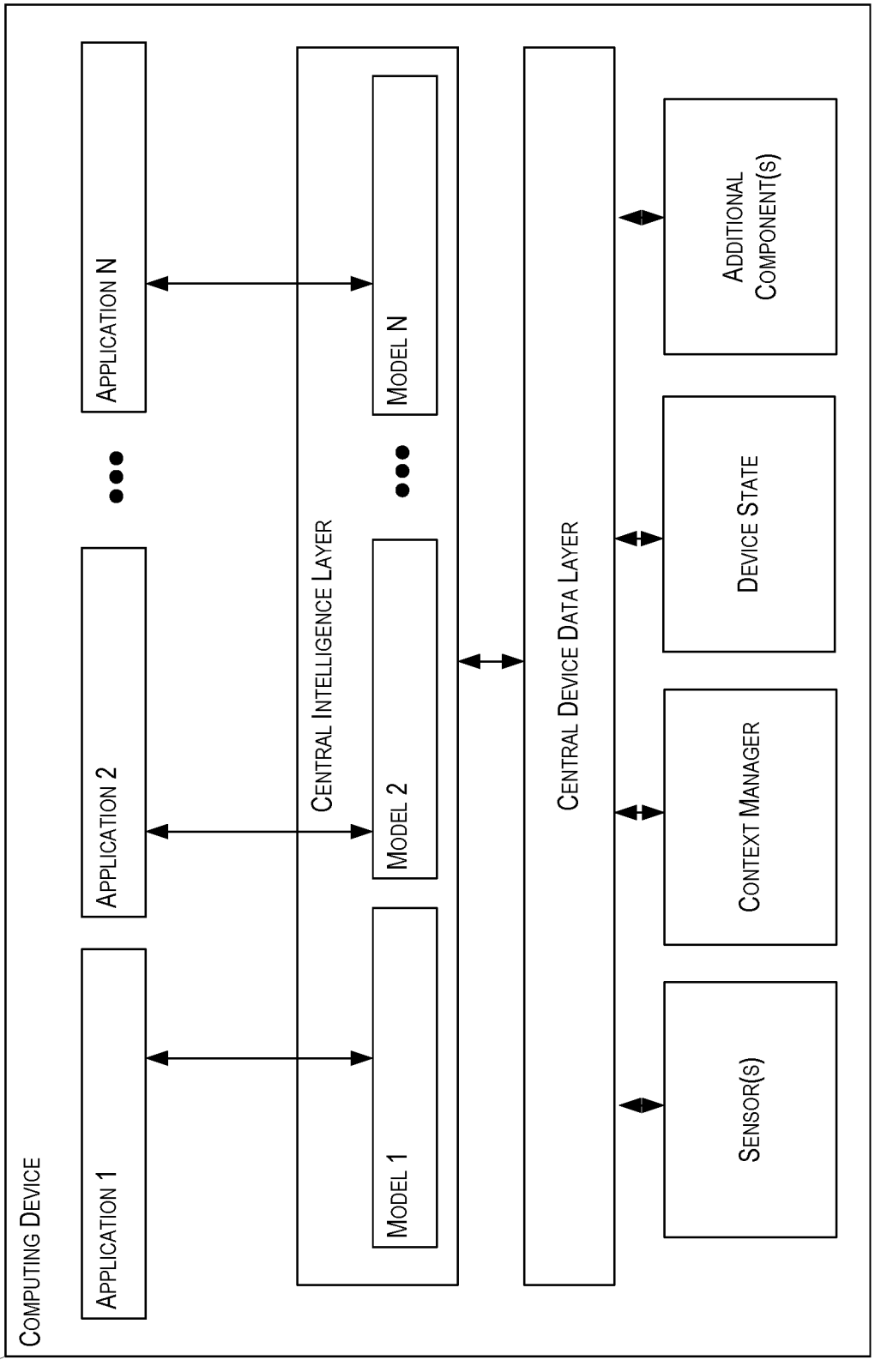
FIG. 1C depicts a block diagram of an example computing device that performs operations associated with message based generation of suggestions for navigation according to example embodiments of the present disclosure.

FIG. 1C depicts a block diagram of an example computing device that performs operations associated with message based generation of suggestions for navigation according to example embodiments of the present disclosure. The computing device 50 can be a user computing device or a server computing device.

The computing device 50 includes a number of applications (e.g., applications 1 through N). Each application is in communication with a central intelligence layer. Example applications include a navigation application, a messaging application (e.g., a text messaging application), a routing application, a mapping application, an email application, a dictation application, a virtual keyboard application, and/or a browser application. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
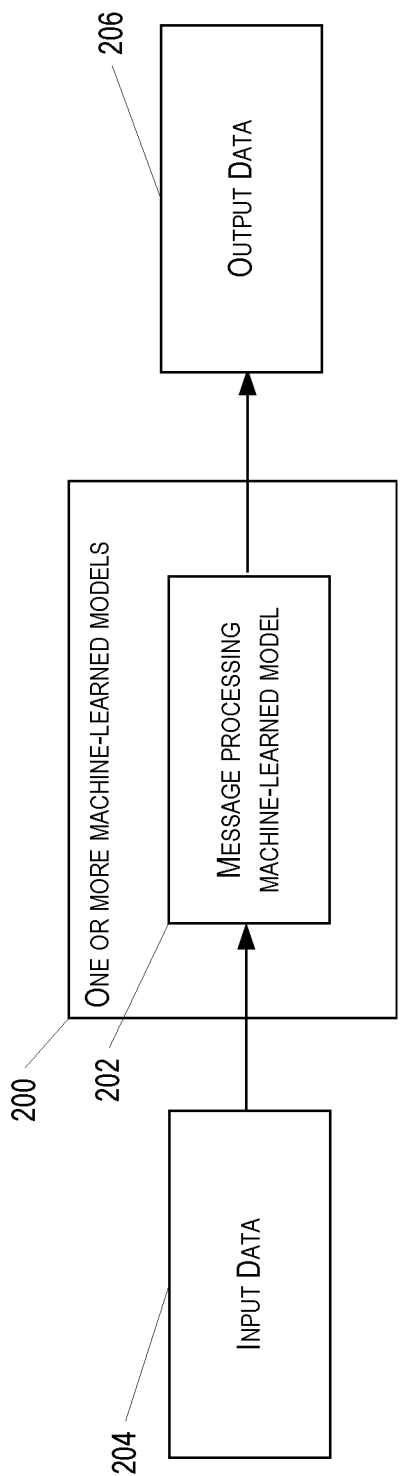
FIG. 2 depicts a block diagram of an example of one or more machine-learned models according to example embodiments of the present disclosure.

FIG. 2 depicts a block diagram of an example of one or more machine-learned models 200 according to example embodiments of the present disclosure. In some implementations, the one or more machine-learned models 200 are trained to receive a set of input data 204 that can include message data, route data, data associated with at least one entity, and/or data associate with one or more objectives; and, after performing one or more operations on the input data 204, generating output data 206 that can include information associated with the one or more suggestions (e.g., one or more suggestions that can be used by a user engaged in a navigation task). Thus, in some implementations, the one or more machine-learned models 200 can include a message processing machine-learned model 202 that is operable to generate output associated with one or more suggestions that can be provided to assist a user engaged in a navigation task.

Figure 3:
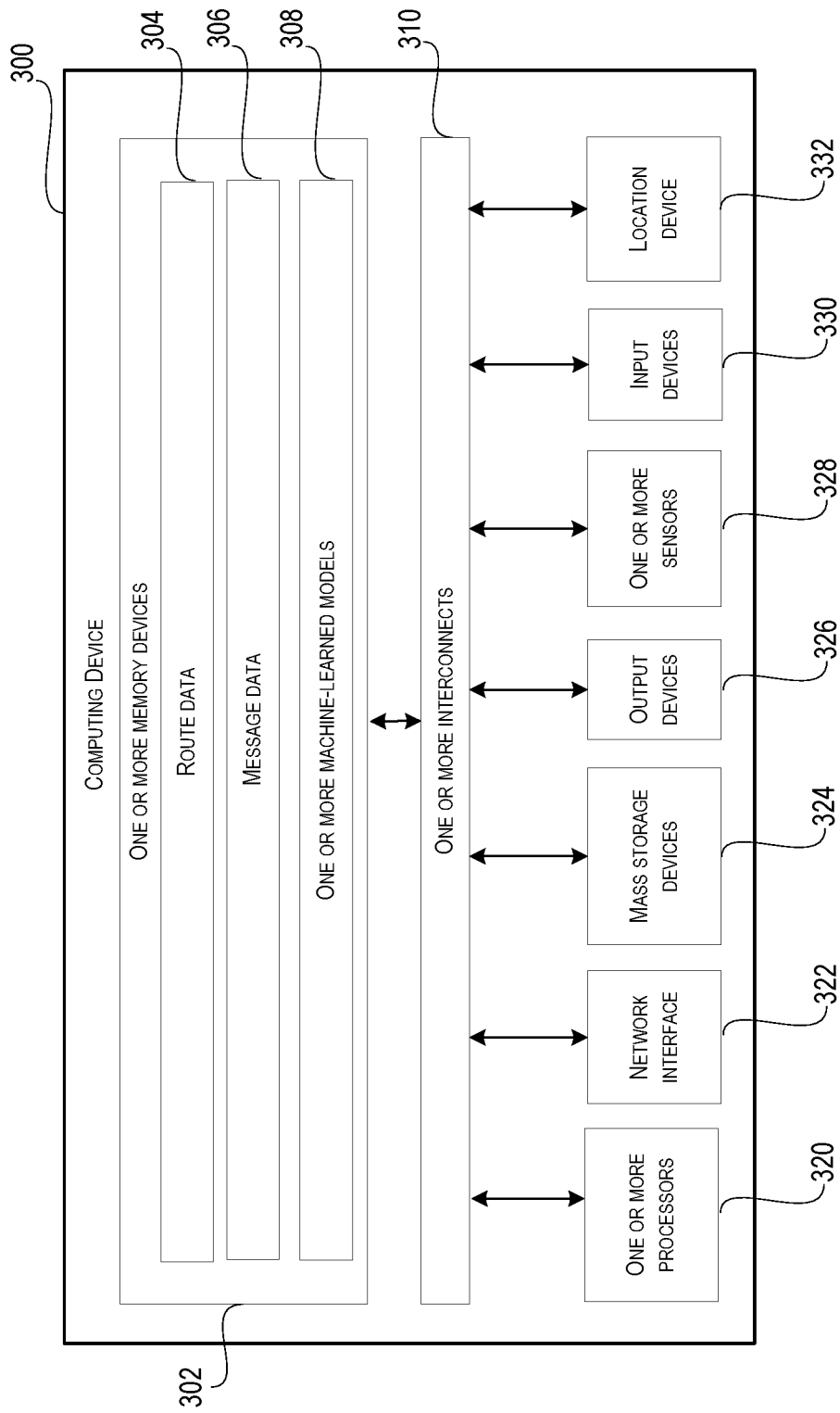
FIG. 3 depicts an example of a user computing device according to example embodiments of the present disclosure.

FIG. 3 depicts a diagram of an example computing device according to example embodiments of the present disclosure. A computing device 300 can include one or more attributes and/or capabilities of the computing device 102, the computing system 130, and/or the training computing system 150. Furthermore, the computing device 300 can perform one or more actions and/or operations including the one or more actions and/or operations performed by the computing device 102, the computing system 130, and/or the training computing system 150, which are depicted in FIG. 1A.

As shown in FIG. 3, the computing device 300 can include one or more memory devices 302, route data 304, message data 306, one or more machine-learned models 308, one or more interconnects 310, one or more processors 320, a network interface 322, one or more mass storage devices 324, one or more output devices 326, one or more sensors 328, one or more input devices 330, and/or the location device 332.

The one or more memory devices 302 can store information and/or data (e.g., the route data 304, the message data 306, and/or the one or more machine-learned models 308). Further, the one or more memory devices 302 can include one or more computer-readable mediums (e.g., tangible non-transitory computer-readable media), including RAM, ROM, EEPROM, EPROM, flash memory devices, magnetic disks, and combinations thereof. The information and/or data stored by the one or more memory devices 302 can be executed by the one or more processors 320 to cause the computing device 300 to perform operations including operations associated with using one or more messages to generate one or more suggestions associated with navigation.

The route data 304 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. Furthermore, the route data 304 can include information associated with one or more routes between a starting location and a destination that can be implemented on the computing device 300. In some embodiments, the route data 304 can be received from one or more computing systems (e.g., the computing system 130 that is depicted in FIG. 1) which can include one or more computing systems that are remote (e.g., in another room, building, part of town, city, or nation) from the computing device 300.

The message data 306 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. Furthermore, the message data 306 can include information associated with one or more portions of text that were transmitted to the computing device 300. In some embodiments, the message data 306 can be received from one or more computing systems (e.g., the computing system 130 that is depicted in FIG. 1) which can include one or more computing systems that are remote from the computing device 300.

The one or more machine-learned models 308 (e.g., the one or more machine-learned models 120 and/or the one or more machine-learned models 140) can include one or more portions of the data 116, the data 136, and/or the data 156 which are depicted in FIG. 1A and/or instructions (e.g., the instructions 118, the instructions 138, and/or the instructions 158 which are depicted in FIG. 1A) that are stored in the memory 114, the memory 134, and/or the memory 154, respectively. Furthermore, the one or more machine-learned models 308 can include information associated with accessing data including route data and/or message data; determining one or more routes; determining at least one entity and/or one or more objectives; generating one or more suggestions; and generating output including one or more indications associated with the one or more suggestions. In some embodiments, the one or more machine-learned models 308 can be received from one or more computing systems (e.g., the computing system 130 that is depicted in FIG. 1) which can include one or more computing systems that are remote from the computing device 300.

The one or more interconnects 310 can include one or more interconnects or buses that can be used to send and/or receive one or more signals (e.g., electronic signals) and/or data (e.g., the route data 304, the message data 306, and/or the one or more machine-learned models 308) between components of the computing device 300, including the one or more memory devices 302, the one or more processors 320, the network interface 322, the one or more mass storage devices 324, the one or more output devices 326, the one or more sensors 328 (e.g., a sensor array), and/or the one or more input devices 330. The one or more interconnects 310 can be arranged or configured in different ways including as parallel or serial connections. Further the one or more interconnects 310 can include one or more internal buses to connect the internal components of the computing device 300; and one or more external buses used to connect the internal components of the computing device 300 to one or more external devices. By way of example, the one or more interconnects 310 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 320 can include one or more computer processors that are configured to execute the one or more instructions stored in the one or more memory devices 302. For example, the one or more processors 320 can, for example, include one or more general purpose central processing units (CPUs), application specific integrated circuits (ASICs), and/or one or more graphics processing units (GPUs). Further, the one or more processors 320 can perform one or more actions and/or operations including one or more actions and/or operations associated with the route data 304, the message data 306, and/or the one or more machine-learned models 308. The one or more processors 320 can include single or multiple core devices including a microprocessor, microcontroller, integrated circuit, and/or a logic device.

The network interface 322 can support network communications. For example, the network interface 322 can support communication via networks including a local area network and/or a wide area network (e.g., the Internet). The one or more mass storage devices 324 (e.g., a hard disk drive and/or a solid state drive) can be used to store data including the route data 304, the message data 306, and/or the one or more machine-learned models 308. The one or more output devices 326 can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

The one or more input devices 330 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 302 and the one or more mass storage devices 324 are illustrated separately, however, the one or more memory devices 302 and the one or more mass storage devices 324 can be regions within the same memory module. The computing device 300 can include one or more additional processors, memory devices, network interfaces, which may be provided separately or on the same chip or board. The one or more memory devices 302 and the one or more mass storage devices 324 can include one or more computer-readable media, including, but not limited to, non-transitory computer-readable media, RAM, ROM, hard drives, flash drives, and/or other memory devices.

The one or more memory devices 302 can store sets of instructions for applications including an operating system that can be associated with various software applications or data. For example, the one or more memory devices 302 can store sets of instructions for applications that can generate output including one or more suggested routes. The one or more memory devices 302 can be used to operate various applications including a mobile operating system developed specifically for mobile devices. As such, the one or more memory devices 302 can store instructions that allow the software applications to access data including data associated with the generation of one or more suggestions for navigation. In other embodiments, the one or more memory devices 302 can be used to operate or execute a general-purpose operating system that operates on both mobile and stationary devices, including for example, smartphones, laptop computing devices, tablet computing devices, and/or desktop computers.

The software applications that can be operated or executed by the computing device 300 can include applications associated with the system 100 shown in FIG. 1A. Further, the software applications that can be operated and/or executed by the computing device 300 can include native applications and/or web-based applications.

The location device 332 can include one or more devices or circuitry for determining the position of the computing device 300. For example, the location device 332 can determine an actual and/or relative position of the computing device 300 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 4:
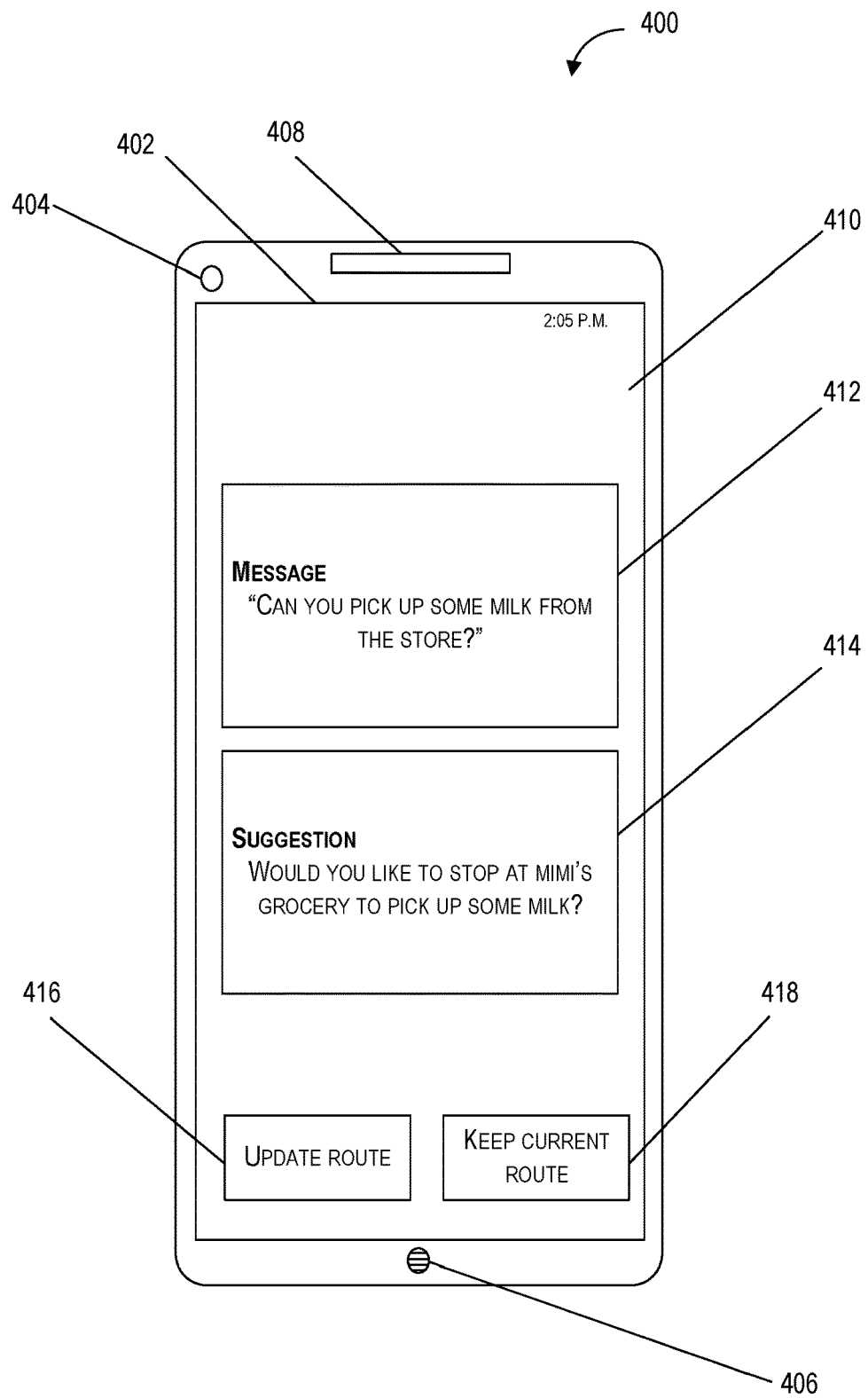
FIG. 4 depicts an example of a suggestion generation system according to example embodiments of the present disclosure.

FIG. 4 depicts an example of a suggestion generation system according to example embodiments of the present disclosure. A computing device 400 can include one or more attributes and/or capabilities of the computing device 102, the computing system 130, the training computing system 150, and/or the computing device 300. Furthermore, the computing device 400 can perform one or more actions and/or operations including the one or more actions and/or operations performed by the computing device 102, the computing system 130, the training computing system 150, and/or the computing device 300.

As shown in FIG. 4, the computing device 400 includes a display component 402, an imaging component 404, an audio input component 406, an audio output component 408, an interface 410, a message 412, a suggestion 414, an interface element 416, and an interface element 418.

The computing device 400 can be configured to perform one or more operations including accessing, processing, sending, receiving, and/or generating data including route data and/or message data, any of which can be used to generate output including one or more suggestions associated with one or more messages and/or one or more routes. Further, the computing device 400 can receive one or more inputs including one or more interactions from a user of the computing device 400. For example, a user can provide an input to confirm a suggestion generated by the computing device 400 with respect to updating a route that a user is currently navigating. In some embodiments, the computing device 400 can be a mobile computing device (e.g., a smartphone and/or a wearable computing device) that is configured to control another computing device and/or computing system; and/or exchange information and/or data with another computing device and/or computing system.

In some embodiments, the computing device 400 can be included as part of an in-vehicle computing system that is used in a vehicle (e.g., an automobile that is operated by a user). Further, the computing device 400 can be configured to send data to an in-vehicle computing system, receive data from the in-vehicle computing system, and/or control the operation of an in-vehicle computing system. For example, the computing device can send data including the suggestion 414 to an in-vehicle computing system that can generate output including one or more visual indications (e.g., displaying visual indications associated with the suggestion 414 on a display device of the in-vehicle computing system) and/or one or more aural indications (e.g., generating a synthetic voice that announces aural indications associated with the suggestion 414 via one or more loud speakers of associated with the in-vehicle computing system).

In this example, the computing device 400 has received the message 412, which is displayed on the interface 410 (e.g., user interface) that is displayed on a display component 402 of the computing device 400. The message 412 indicates "CAN YOU PICK UP SOME MILK FROM THE STORE?" and is from the spouse of the user associated with the computing device 400. Apart from the message that is visible in the message 412, the message 412 can be associated with message data that can include metadata associated with the time the message 412 was sent, the location of the device that sent the message 412, and/or metadata that includes information associated with a relationship of the sender of the message with respect to the user. The computing device 400 can determine the identity of the entity (the user's spouse) that sent the message 412 based at least in part on the implementation or use of one or more heuristics and/or one or more machine-learned models. Though the message 412 is displayed on the interface 410 that is generated on the display component 402 in this example, in other embodiments the message 412 is not generated on the interface 410 and is not shown or displayed on the display component 402.

For example, the computing device 400 can use the telephone number associated with the message 412 to determine the entity that probably sent the message (e.g., the user's spouse). Further, the computing device 400 can determine that the word "STORE" is a location type entity and that the word "MILK" is an object type entity. The computing device 400 can also parse the message 412 and detect the key words "PICK UP" and "MILK" in combination with "STORE" to determine that the objective of the message 412 is to request that the user pick up some milk from a store, which can be determined based at least in part on route data (e.g., route data that is stored on the computing device 400 and/or route data that is accessed from a remote computing device) that can include a current route being traversed by the user of the computing device 400, one or more locations of stores that the user had previously visited, and/or one or more locations of stores that are within some predetermined distance of the route that the user is currently travelling.

By way of further example, the computing device 400 can use message data associated with the message 412 as an input to one or more machine-learned models that are implemented on the computing device 400 and/or that are implemented on a remote computing device that is able to exchange data and/or information with the computing device 400. The one or more machine-learned models can generate output that includes a determination of the entity (the user's spouse) and one or more objectives (e.g., to pick up milk from the store) that are associated with the message 412.

Further, the computing device 400 can use one or more heuristics to generate one or more suggestions including the suggestion 414. For example, the computing device 400 can use one or more probabilistic models to predict one or more suggestions that are associated with the entity and one or more objectives of the message 412. By way of further example, the computing device 400 can use the one or more machine-learned models to generate an output including the suggestion 414.

The suggestion 414 is displayed on the interface 410 and indicates "WOULD YOU LIKE TO STOP AT MIMI'S GROCERY TO PICK UP SOME MILK?" The computing device 400 also generates the interface element 416 and the interface element 418, which are associated with and/or based at least in part on the suggestion 414. The interface element 416 indicates "UPDATE ROUTE" and offers the user the option of updating the current route (or generating a new route if the user is not currently travelling) by adding a waypoint that will pass by Mimi's grocery store so that the user can pick up some milk. If the user touches (e.g., taps) the interface element 416, the computing device 400 can update the route and may provide a further indication that the route was updated (e.g., an auditory announcement "ROUTE UPDATED" and/or a visual indication "RE-ROUTING TO MIMI'S GROCERY STORE").

The interface element 418 indicates "KEEP CURRENT ROUTE" and offers the user the option of not updating the current route and remaining on the current route that the user is travelling on, or in the event that the user is not travelling on a route, not generating a route to Mimi's grocery store. If the user touches (e.g., taps) the interface element 418, the computing device 400 will not change the current route and may provide a further indication that the route was not updated (e.g., an auditory announcement "KEEPING THE CURRENT ROUTE" and/or a visual indication "REMAINING ON THE CURRENT ROUTE"). If the computing device 400 determines that the user has not accepted the suggestion 414, the computing device 400 can generate another suggestion as an alternative to the suggestion 414. For example, the computing device 500 can generate a suggestion to "WOULD YOU LIKE TO INFORM YOUR SPOUSE THAT YOU CAN'T PICK UP SOME MILK" that will send a reply message to the user's spouse to inform her that the user of the computing device 500 cannot pick up some milk.

In some embodiments, the computing device 400 can generate the message 412 and/or the suggestion 414 via the audio output component 408. For example, the computing device 400 can generate a synthetic voice that reads the message 412 and/or the suggestion 414 via the audio output component 408. Further, the audio output component 408 can be used to signal (e.g., by a chime or beeping sound) to the user of the computing device 400 that the message 412 was received and/or that the suggestion 414 was generated.

In some embodiments, the computing device 400 can use one or more sensors to monitor the user and receive the user's feedback to perform one or more operations. For example, the computing device 400 can use the imaging component 404 (e.g., a camera) to detect one or more gestures of the user of the computing device 400. If the computing device 400 determines that the user nodded their head, the computing device 400 can determine that the user agrees with the suggestion 414 and would like the suggestion 414 to be implemented. If the computing device 400 determines that the user shakes their head, the computing device 400 can determine that the user disagrees with the suggestion 414 and will not implement the suggestion 414. Further, the computing device 400 can receive user feedback via the audio input component 406 (e.g., a microphone). If the computing device 400 determines that the user has said "YES, REROUTE TO THE STORE" the computing device 400 can determine that the user agrees with the suggestion 414 and would like the suggestion 414 to be implemented. If the computing device 400 determines that the user has said "NO, I'M TOO BUSY" the computing device 400 can determine that the user disagrees with the suggestion 414 and will not implement the suggestion 414. Further, in response to the user disagreeing with the suggestion 414, the computing device 400 can generate a message "NO, I'M TOO BUSY" that can be presented to the user and, after the user has provided their consent, sent to the sender of the message 412.

Figure 5:
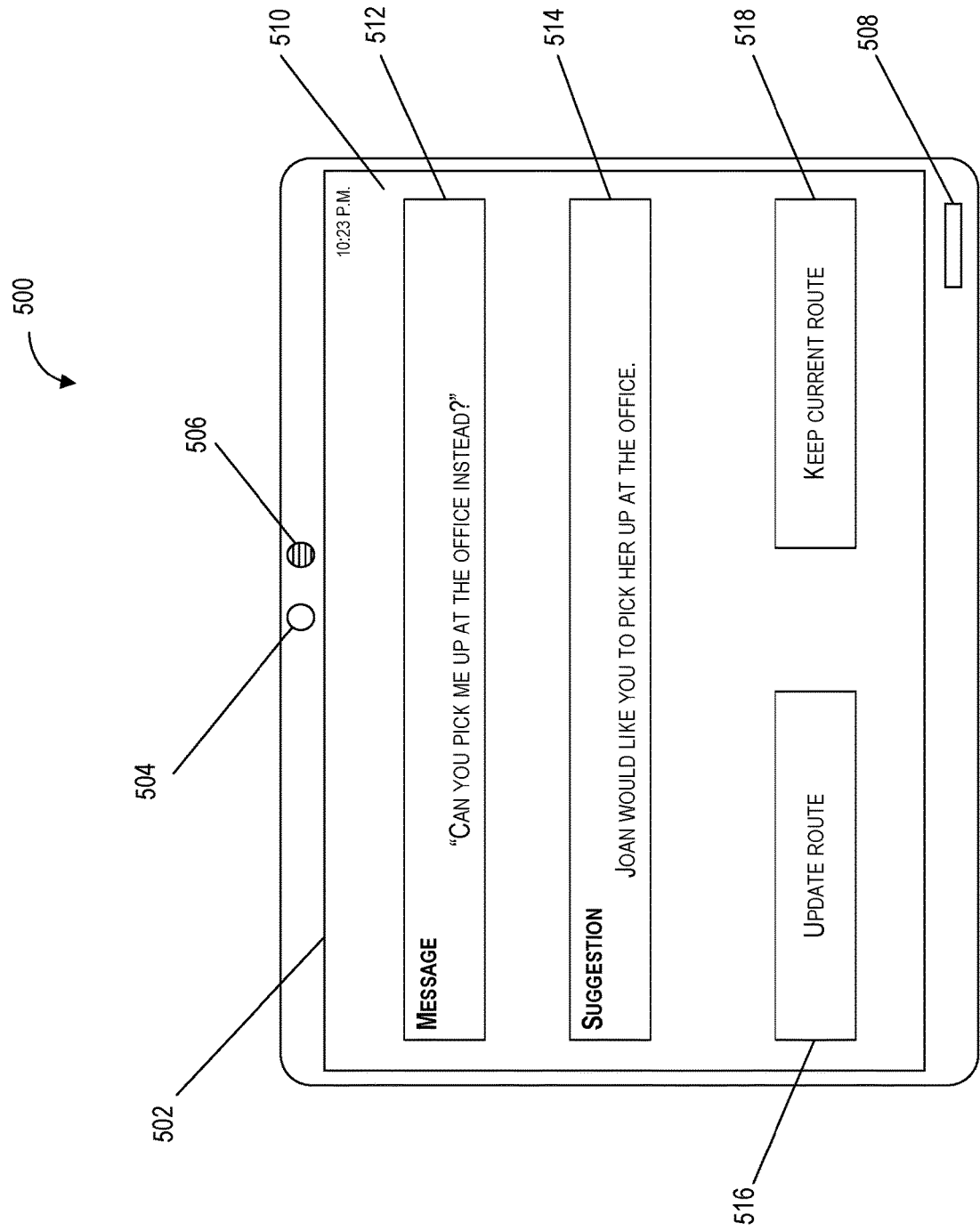
FIG. 5 depicts an example of a suggestion generation system according to example embodiments of the present disclosure.

FIG. 5 depicts an example of a suggestion generation system according to example embodiments of the present disclosure. A computing device 500 can include one or more attributes and/or capabilities of the computing device 102, the computing system 130, the training computing system 150, and/or the computing device 300. Furthermore, the computing device 500 can perform one or more actions and/or operations including the one or more actions and/or operations performed by the computing device 102, the computing system 130, the training computing system 150, and/or the computing device 300.

As shown in FIG. 5, the computing device 500 includes a display component 502, an imaging component 504, an audio input component 506, an audio output component 508, an interface 510, a message 512, a suggestion 514, an interface element 516, and an interface element 518.

The computing device 500 can be configured to perform one or more operations including accessing, processing, sending, receiving, and/or generating data including route data and/or message data, any of which can be used to generate output including one or more suggestions associated with one or more messages and/or one or more routes. Further, the computing device 500 can receive one or more inputs including one or more interactions from a user of the computing device 500. For example, a user can provide an input to confirm a suggestion generated by the computing device 500 with respect to updating a route that a user is currently navigating. In some embodiments, the computing device 500 can be a mobile computing device (e.g., a smartphone and/or a wearable computing device) that is configured to control another computing device and/or computing system; and/or exchange information and/or data with another computing device and/or computing system.

In some embodiments, the computing device 500 can be included as part of an in-vehicle computing system that is used in a vehicle (e.g., an automobile that is operated by a user). Further, the computing device 500 can be configured to send data to an in-vehicle computing system, receive data from the in-vehicle computing system, and/or control the operation of an in-vehicle computing system. For example, the computing device can send data including the suggestion 514 to an in-vehicle computing system that can generate output including one or more visual indications (e.g., displaying visual indications associated with the suggestion 514 on a display device of the in-vehicle computing system) and/or one or more aural indications (e.g., generating a synthetic voice that announces aural indications associated with the suggestion 514 via one or more loud speakers of associated with the in-vehicle computing system).

In this example, the computing device 500 has received the message 512, which is displayed on the interface 510 (e.g., user interface) that is displayed on a display component 502 of the computing device 500. The message 512 indicates "CAN YOU PICK ME UP AT THE OFFICE INSTEAD?" and is from the co-worker of the user associated with the computing device 500. Apart from the message that is visible in the message 512, the message 512 can be associated with message data that can include metadata associated with the time the message 512 was sent, the location of the device that sent the message 512, and/or metadata that includes information associated with a relationship (co-worker) of the sender of the message with respect to the user. The computing device 500 can determine the identity of the entity (the user's co-worker "Joan") that sent the message 512 based at least in part on the implementation or use of one or more heuristics and/or one or more machine-learned models. Further, the relationship of the sender of the message with respect to the user of the computing device 400 can determine whether a suggestion is generated. For example, if the sender of the message is determined not to be associated with the user of the computing device (e.g., the sender misdialed the user), the computing device 500 may not display the message 512 and/or may not generate the suggestion 514.

The computing device 500 can use the instant-messaging application identifier associated with the message 512 to determine the entity that probably sent the message (e.g., the user's co-worker). Further, the computing device 500 can determine that the word "OFFICE" is a location type entity. The computing device 500 can also parse the message 512 and detect the key words "PICK ME UP" and "INSTEAD" in combination with the word "OFFICE" to determine that the objective of the message 512 is for the user to modify (update) their route in order to pick up the entity (the co-worker) from the entity's office which can be determined based at least in part on route data that can include locations that the user has previously visited and/or locations that are within some predetermined distance of the current location of the computing device 500.

By way of further example, the computing device 500 can use route data associated with a route of the computing device 500 and/or message data associated with the message 512 as an input to one or more machine-learned models that are implemented on the computing device 500 and/or that are implemented on a remote computing device that is able to exchange data and/or information with the computing device 500. The one or more machine-learned models can generate output that includes a determination of the entity (the user's co-worker) and one or more objectives (e.g., to update the route to pick up the co-worker from the office) that are associated with the message 512.

Further, the computing device 500 can use one or more heuristics to generate one or more suggestions including the suggestion 514. For example, the computing device 500 can use one or more probabilistic models to predict one or more suggestions that are associated with the entity and one or more objectives of the message 512. By way of further example, the computing device 500 can use the one or more machine-learned models (e.g., one or more natural language processing models and/or one or more triggering models) to generate an output including the suggestion 514.

The suggestion 514 is displayed on the interface 510 and indicates "JOAN WOULD LIKE YOU TO PICK HER UP AT THE OFFICE" The computing device 500 also generates the interface element 516 and the interface element 518, which are associated with and/or based at least in part on the suggestion 514. The interface element 516 indicates "UPDATE ROUTE" and offers the user the option of updating the current route (or generating a new route if the user is not currently travelling) by adding a waypoint that will pass by the co-worker's office so that the user can pick up the co-worker. If the user touches (e.g., taps) the interface element 516, the computing device 500 can update the route and may provide a further indication that the route was updated (e.g., an auditory announcement "ROUTE UPDATED TO PICK UP JOAN" and/or a visual indication "RE-ROUTING TO THE OFFICE").

The interface element 518 indicates "KEEP CURRENT ROUTE" and offers the user the option of not updating the current route and remaining on the current route that the user is travelling on, or in the event that the user is not travelling on a route, not generating a route to co-worker's office. If the user touches (e.g., taps) the interface element 518, the computing device 500 will not change the current route and may provide a further indication that the route was not updated (e.g., an auditory announcement "NO ROUTE CHANGE" and/or a visual indication "STAYING ON THE CURRENT ROUTE"). If the computing device 500 determines that the user has not accepted the suggestion 514, the computing device 500 can generate another suggestion as an alternative to the suggestion 514. For example, the computing device 500 can generate a suggestion to "WOULD YOU LIKE TO TELL JOAN THAT YOU CAN"T PICK HER UP AT THE OFFICE" that will send a reply message to Joan to inform her that the user of the computing device 500 cannot pick her up at the office.

In some embodiments, the computing device 500 can generate the message 512 and/or the suggestion 514 via the audio output component 508. For example, the computing device 500 can generate a synthetic voice that reads the message 512 and/or the suggestion 514 via the audio output component 508. Further, the audio output component 508 can be used to signal (e.g., by a ring tone) to the user of the computing device 500 that the message 512 was received and/or that the suggestion 514 was generated.

In some embodiments, the computing device 500 can use one or more sensors to monitor the user and receive the user's feedback to perform one or more operations. For example, the computing device 500 can use the imaging component 504 (e.g., a camera) to detect one or more gestures of the user of the computing device 500. If the computing device 500 determines that the user gives a thumbs up gesture, the computing device 500 can determine that the user agrees with the suggestion 514 and would like the suggestion 514 to be implemented. If the computing device 500 determines that the user shakes their hand or gives a thumbs down gesture, the computing device 500 can determine that the user disagrees with the suggestion 514 and will not implement the suggestion 514. Further, the computing device 500 can receive user feedback via the audio input component 506 (e.g., a microphone). If the computing device 500 determines that the user has said "LETS PASS BY THE OFFICE" the computing device 500 can determine that the user agrees with the suggestion 514 and would like the suggestion 514 to be implemented. If the computing device 500 determines that the user has said "NOT NOW" the computing device 500 can determine that the user disagrees with the suggestion 514 and will not implement the suggestion 514.

Figure 6:
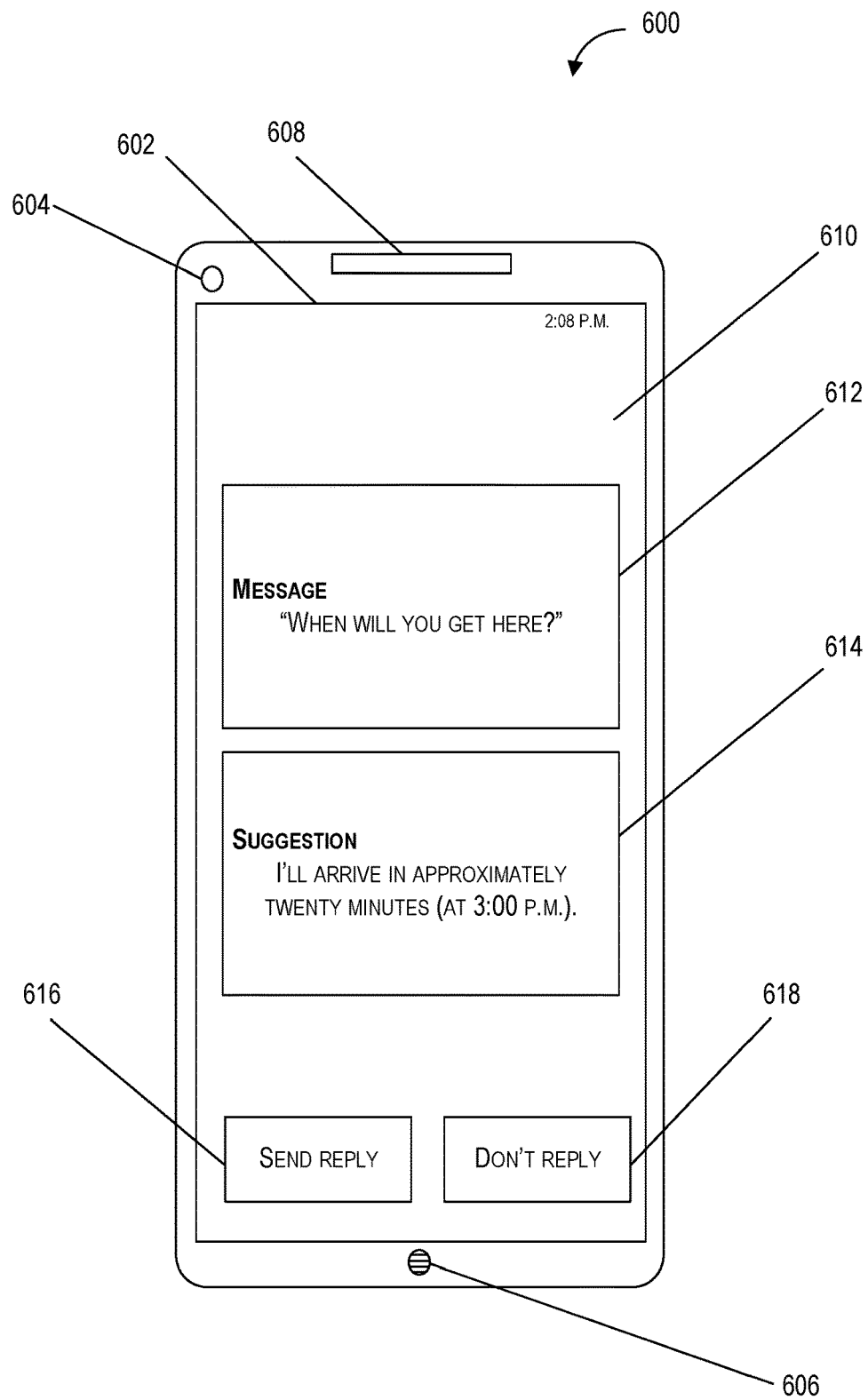
FIG. 6 depicts an example of a suggestion generation system according to example embodiments of the present disclosure.

FIG. 6 depicts an example of a suggestion generation system according to example embodiments of the present disclosure. A computing device 600 can include one or more attributes and/or capabilities of the computing device 102, the computing system 130, the training computing system 150, and/or the computing device 300. Furthermore, the computing device 600 can perform one or more actions and/or operations including the one or more actions and/or operations performed by the computing device 102, the computing system 130, the training computing system 150, and/or the computing device 300.

As shown in FIG. 6, the computing device 600 includes a display component 602, an imaging component 604, an audio input component 606, an audio output component 608, an interface 610, a message 612, a suggestion 614, an interface element 616, and an interface element 618.

The computing device 600 can be configured to perform one or more operations including accessing, processing, sending, receiving, and/or generating data including route data and/or message data, any of which can be used to generate output including one or more suggestions associated with one or more messages and/or one or more routes. Further, the computing device 600 can receive one or more inputs including one or more interactions from a user of the computing device 600. For example, a user can provide an input to confirm a suggestion generated by the computing device 600 with respect to a response to an incoming message that was sent to the user of the computing device 600. In some embodiments, the computing device 600 can be a mobile computing device (e.g., a smartphone and/or a wearable computing device) that is configured to control another computing device and/or computing system; and/or exchange information and/or data with another computing device and/or computing system.

In some embodiments, the computing device 600 can be included as part of an in-vehicle computing system that is used in a vehicle (e.g., an automobile that is operated by a user). Further, the computing device 600 can be configured to send data to an in-vehicle computing system, receive data from the in-vehicle computing system, and/or control the operation of an in-vehicle computing system. For example, the computing device can send data including the suggestion 614 to an in-vehicle computing system that can generate output including one or more visual indications (e.g., displaying visual indications associated with the suggestion 614 on a display device of the in-vehicle computing system) and/or one or more aural indications (e.g., generating a synthetic voice that announces aural indications associated with the suggestion 614 via one or more loud speakers of associated with the in-vehicle computing system).

In this example, the computing device 600 has received the message 612, which is displayed on the interface 610 (e.g., user interface) that is displayed on a display component 602 of the computing device 600. The message 612 indicates "WHEN WILL YOU GET HERE?" and is from the son of the user associated with the computing device 600. Apart from the message that is visible in the message 612, the message 612 can be associated with message data that can include metadata associated with the time the message 612 was sent, the location of the device that sent the message 612, and/or metadata that includes information associated with a relationship of the sender of the message with respect to the user. The computing device 600 can determine the identity of the entity (the user's son) that sent the message 612 based at least in part on the implementation or use of one or more heuristics and/or one or more machine-learned models.

For example, the computing device 600 can use the Internet Protocol (IP) associated with the message 612 to determine the entity (e.g., person type entity) that is likely to have sent the message (e.g., the user's son). Further, the computing device 600 can determine that the word "HERE" is a location type entity that refers to the current location of the sender of the message 612. The computing device 600 can also parse the message 612 and detect the key words "WHEN" in combination with the word "HERE" to determine that the objective of the message 612 is to request a time that the user will arrive at the location of the sender of the message 612, which can be determined based at least in part on route data (e.g., route data that is stored on the computing device 600 and/or route data that is accessed from a remote computing device) that can include a location of the sender of the message 612 and the current location of the computing device 600. The computing device 600 can then use the current location of the computing device 600 and the location of the sender of the message 612 to determine an estimated time of arrival at the location of the sender of the message 612.

By way of further example, the computing device 600 can use message data associated with the message 612 as an input to one or more machine-learned models that are implemented on the computing device 600 and/or that are implemented on a remote computing device that is able to exchange data and/or information with the computing device 600. The one or more machine-learned models can generate output that includes a determination of the entity (the user's son) and one or more objectives (e.g., a request for the estimated time of arrival) that are associated with the message 612.

Further, the computing device 600 can use one or more heuristics to generate one or more suggestions including the suggestion 614. For example, the computing device 600 can use one or more probabilistic models to predict one or more suggestions that are associated with the entity and one or more objectives of the message 612. By way of further example, the computing device 600 can use the one or more machine-learned models to generate an output including the suggestion 614.

The suggestion 614 is displayed on the interface 610 and indicates a suggested reply to the sender of the message 612. The suggestion 614 indicates "I'LL ARRIVE IN APPROXIMATELY TWENTY MINUTES (AT 3:00 P.M.)" The computing device 600 also generates the interface element 616 and the interface element 618, which are associated with and/or based at least in part on the suggestion 614. The interface element 616 indicates "SEND REPLY" and offers the user the option of sending a reply to the sender of the message 612.

If the user touches (e.g., taps) the interface element 616, the computing device 600 can send the reply in the suggestion 614 and generate an indication that the reply was sent (e.g., an auditory announcement "REPLY SENT" and/or a visual indication of an animated message envelope being sent).

The interface element 618 indicates "DON'T REPLY" and offers the user the option of not replying to the message 612. If the user touches (e.g., taps) the interface element 618, the computing device 600 will not send a reply to the message 612. If the computing device 600 determines that the user has not accepted the suggestion 614, the computing device 600 can generate another suggestion as an alternative to the suggestion 614. For example, the computing device 600 can generate a suggestion indicating "I'M STUCK IN TRAFFIC, I'LL LET YOU KNOW IN TEN MINUTES" that will send a reply message to the user's son to inform him that the user will send an estimated time of arrival in ten (10) minutes.

In some embodiments, the computing device 600 can generate the message 612 and/or the suggestion 614 via the audio output component 608. For example, the computing device 600 can generate a synthetic voice that reads the message 612 and/or the suggestion 614 via the audio output component 608. Further, the audio output component 608 can be used to indicate (e.g., by a musical tone) to the user of the computing device 600 that the message 612 was received and/or that the suggestion 614 was generated.

In some embodiments, the computing device 600 can use one or more sensors to monitor the user and receive the user's feedback to perform one or more operations. For example, the computing device 600 can use the imaging component 604 (e.g., a camera) to detect one or more gestures of the user of the computing device 600. If the computing device 600 determines that the user nodded their head, the computing device 600 can determine that the user agrees with the suggestion 614 and would like the suggestion 614 to be implemented. If the computing device 600 determines that the user shakes their head, the computing device 600 can determine that the user disagrees with the suggestion 614 and will not implement the suggestion 614. Further, the computing device 600 can receive user feedback via the audio input component 606 (e.g., a microphone). If the computing device 600 determines that the user has said "YES, SEND THE REPLY" the computing device 600 can determine that the user agrees with the suggestion 614 and would like the suggestion 614 to be implemented. If the computing device 600 determines that the user has said "NO, DON'T REPLY" the computing device 600 can determine that the user disagrees with the suggestion 614 and will not implement the suggestion 614.

Figure 7:
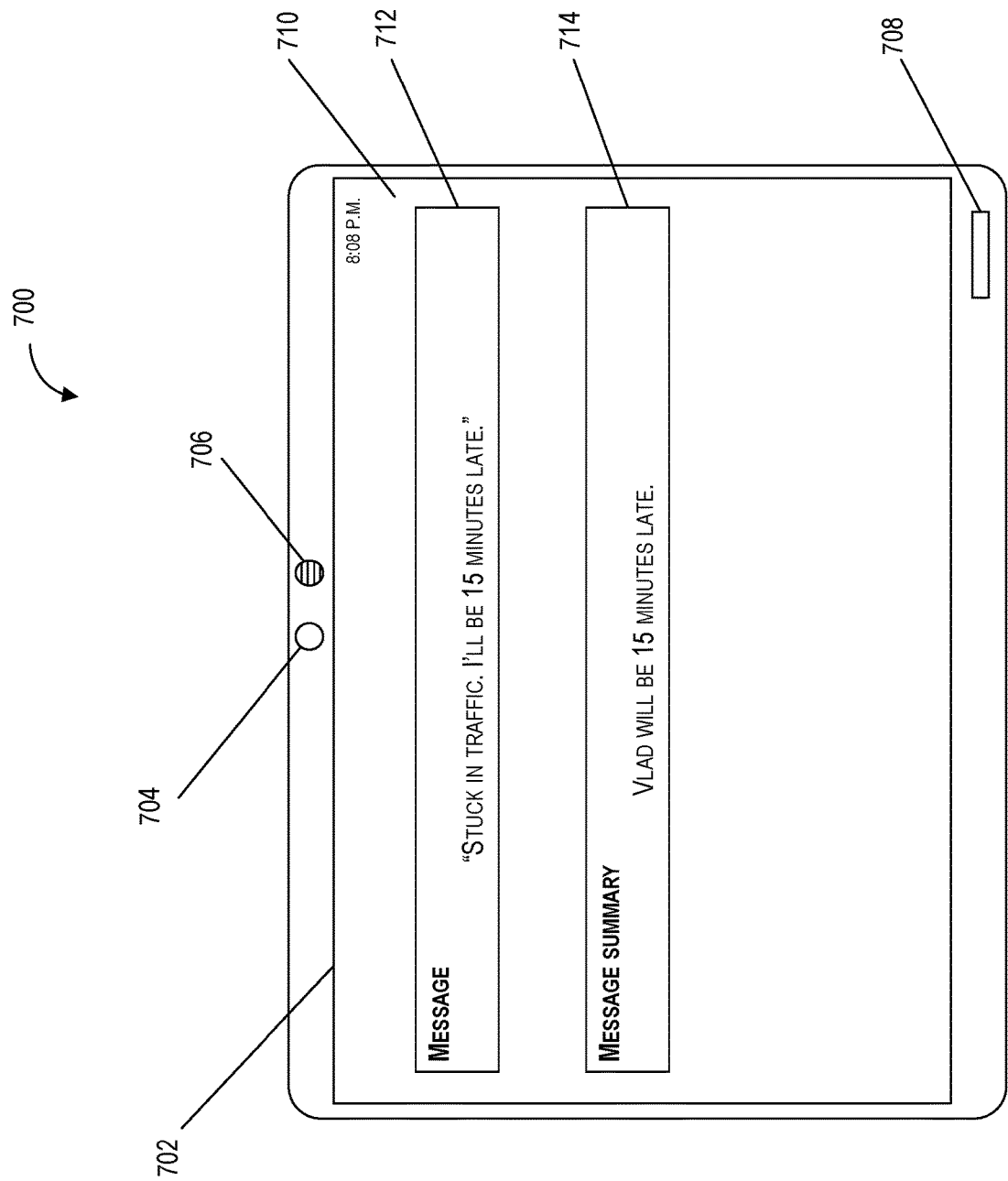
FIG. 7 depicts an example of a suggestion generation system according to example embodiments of the present disclosure.

FIG. 7 depicts an example of a suggestion generation system according to example embodiments of the present disclosure. A computing device 700 can include one or more attributes and/or capabilities of the computing device 102, the computing system 130, the training computing system 150, and/or the computing device 300. Furthermore, the computing device 700 can perform one or more actions and/or operations including the one or more actions and/or operations performed by the computing device 102, the computing system 130, the training computing system 150, and/or the computing device 300.

As shown in FIG. 7, the computing device 700 includes a display component 702, an imaging component 704, an audio input component 706, an audio output component 708, an interface 710, a message 712, and a message summary 714.

The computing device 700 can be configured to perform one or more operations including accessing, processing, sending, receiving, and/or generating data including route data and/or message data, any of which can be used to generate output including one or more suggestions associated with one or more messages and/or one or more routes. Further, the computing device 700 can receive one or more inputs including one or more interactions from a user of the computing device 700. For example, a user can provide an input to confirm a suggestion generated by the computing device 700 with respect to updating a route that a user is currently navigating. In some embodiments, the computing device 700 can be a mobile computing device (e.g., a smartphone and/or a wearable computing device) that is configured to control another computing device and/or computing system; and/or exchange information and/or data with another computing device and/or computing system.

In some embodiments, the computing device 700 can be included as part of an in-vehicle computing system that is used in a vehicle (e.g., an automobile that is operated by a user). Further, the computing device 700 can be configured to send data to an in-vehicle computing system, receive data from the in-vehicle computing system, and/or control the operation of an in-vehicle computing system. For example, the computing device can send data including the suggestion 714 to an in-vehicle computing system that can generate output including one or more visual indications (e.g., displaying visual indications associated with the suggestion 714 on a display device of the in-vehicle computing system) and/or one or more aural indications (e.g., generating a synthetic voice that announces aural indications associated with the suggestion 714 via one or more loud speakers of associated with the in-vehicle computing system).

In this example, the computing device 700 has received the message 712, which is displayed on the interface 710 (e.g., user interface) that is displayed on a display component 702 of the computing device 700. The message 712 indicates "STUCK IN TRAFFIC. I'LL BE 15 MINUTES LATE" and is from the colleague of the user associated with the computing device 700. Apart from the message that is visible in the message 712, the message 712 can be associated with message data that can include metadata associated with the time the message 712 was sent, the location of the device that sent the message 712, and/or metadata that includes information associated with a relationship of the sender of the message with respect to the user. The computing device 700 can determine the identity of the entity (the user's colleague) that sent the message 712 based at least in part on the implementation or use of one or more heuristics and/or one or more machine-learned models.

For example, the computing device 700 can use the instant message application user name associated with the message 712 to determine the entity that probably sent the message (e.g., the user's colleague). The computing device 700 can also parse the message 712 and detect the key word "TRAFFIC" in combination with the key words "15 MINUTES LATE" to determine that the objective of the message 712 is to inform the user that the sender of the message 712 will be fifteen (15) minutes late.

By way of further example, the computing device 700 can use message data associated with the message 712 as an input to one or more machine-learned models that are implemented on the computing device 700 and/or that are implemented on a remote computing device that is able to exchange data and/or information with the computing device 700. The one or more machine-learned models can generate output that includes a determination of the entity (the user's colleague) and one or more objectives (e.g., to inform the user that the colleague is stuck in traffic and will be late) that are associated with the message 712. In this example, the computing device 700 can determine that the one or more objectives of the message 712 are to provide information to the user of the computing device 700 and that a suggestion does not need to be generated.

Further, the computing device 700 can use one or more heuristics to generate the message summary 714. For example, the computing device 700 can use one or more probabilistic models to generate the message summary 714, which includes the name of the entity ("VLAD") and a summary of the message 712. In some embodiments, the computing device 700 can use the one or more machine-learned models to generate an output including the message summary 714. Further, the message summary 714 is displayed on the interface 710 and provides a summary of the message 712 that includes the identity of the entity ("VLAD") that was not included in the message 712. The message summary 714 indicates "VLAD WILL BE 15 MINUTES LATE." In this way, the computing device 700 can provide the user with the name of the sender of the message 712 and rephrases the message 712 in a way that includes information that is pertinent to the user.

Figure 8:
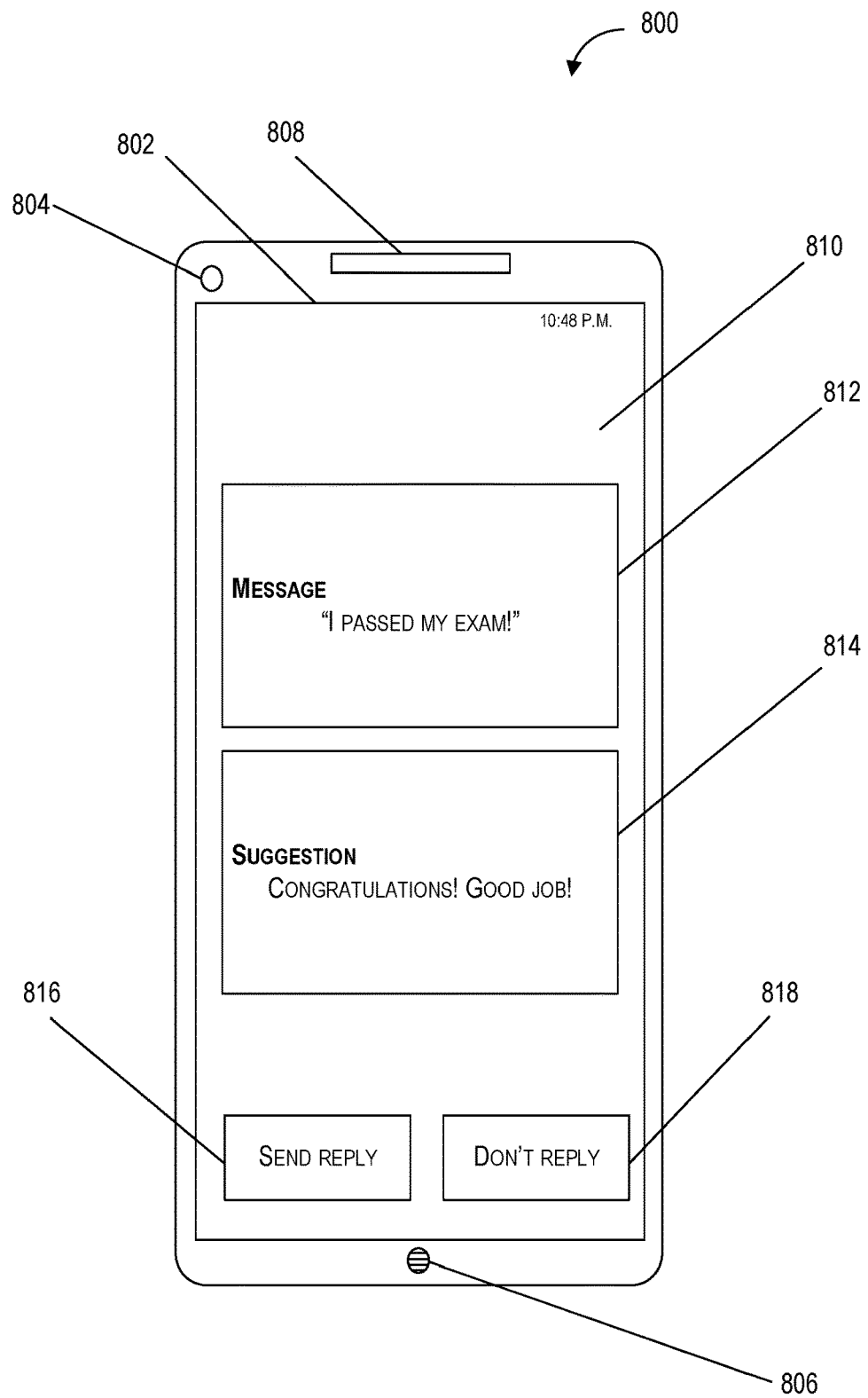
FIG. 8 depicts an example of a suggestion generation system according to example embodiments of the present disclosure.

FIG. 8 depicts an example of a suggestion generation system according to example embodiments of the present disclosure. A computing device 800 can include one or more attributes and/or capabilities of the computing device 102, the computing system 130, the training computing system 150, and/or the computing device 300. Furthermore, the computing device 800 can perform one or more actions and/or operations including the one or more actions and/or operations performed by the computing device 102, the computing system 130, the training computing system 150, and/or the computing device 300.

As shown in FIG. 8, the computing device 800 includes a display component 802, an imaging component 804, an audio input component 806, an audio output component 808, an interface 810, a message 812, a suggestion 814, an interface element 816, and an interface element 818.

The computing device 800 can be configured to perform one or more operations including accessing, processing, sending, receiving, and/or generating data including route data and/or message data, any of which can be used to generate output including one or more suggestions associated with one or more messages and/or one or more routes. Further, the computing device 800 can receive one or more inputs including one or more interactions from a user of the computing device 800. For example, a user can provide an input to confirm a suggestion generated by the computing device 800 with respect to replying to one or more messages that were received by the computing device 800. In some embodiments, the computing device 800 can be a mobile computing device (e.g., a smartphone and/or a wearable computing device) that is configured to control another computing device and/or computing system; and/or exchange information and/or data with another computing device and/or computing system.

In some embodiments, the computing device 800 can be included as part of an in-vehicle computing system that is used in a vehicle (e.g., an automobile that is operated by a user). Further, the computing device 800 can be configured to send data to an in-vehicle computing system, receive data from the in-vehicle computing system, and/or control the operation of an in-vehicle computing system. For example, the computing device can send data including the suggestion 814 to an in-vehicle computing system that can generate output including one or more visual indications (e.g., displaying visual indications associated with the suggestion 814 on a display device of the in-vehicle computing system) and/or one or more aural indications (e.g., generating a synthetic voice that announces aural indications associated with the suggestion 814 via one or more loud speakers of associated with the in-vehicle computing system).

In this example, the computing device 800 has received the message 812, which is displayed on the interface 810 (e.g., user interface) that is displayed on a display component 802 of the computing device 800. The message 812 indicates "I PASSED MY EXAM!" and is from the son of the user associated with the computing device 800. Apart from the message that is visible in the message 812, the message 812 can be associated with message data that can include metadata associated with the time the message 812 was sent, the location of the device that sent the message 812, and/or metadata that includes information associated with a relationship of the sender of the message with respect to the user. The computing device 800 can determine the identity of the entity (the user's son) that sent the message 812 based at least in part on the implementation or use of one or more heuristics and/or one or more machine-learned models.

For example, the computing device 800 can use the instant messaging application identifier associated with the sender of the message 812 to determine the entity (e.g., the user's son) that sent the message. The computing device 800 can also parse the message 812 and detect the key word "PASSED" in combination with the word "EXAM" to determine that the objective of the message 812 is to provide information to the user of the computing device 800.

By way of further example, the computing device 800 can use message data associated with the message 812 as an input to one or more machine-learned models that are implemented on the computing device 800 and/or that are implemented on a remote computing device that is able to exchange data and/or information with the computing device 800. The one or more machine-learned models can generate output that includes a determination of the entity (the user's son) and one or more objectives (e.g., to provide information about an exam) that are associated with the message 812.

Further, the computing device 800 can use one or more heuristics to generate one or more suggestions including the suggestion 814. For example, the computing device 800 can use one or more probabilistic models to predict one or more suggestions that are associated with the entity and one or more objectives of the message 812. By way of further example, the computing device 800 can use the one or more machine-learned models to generate an output including the suggestion 814.

The suggestion 814 is displayed on the interface 810 and indicates "CONGRATULATIONS! GOOD JOB!" The computing device 800 also generates the interface element 816 and the interface element 818, which are associated with and/or based at least in part on the suggestion 814. The interface element 816 indicates "SEND REPLY" and offers the user the option of sending a reply to the sender of the message 812.

If the user touches (e.g., taps) the interface element 816, the computing device 800 can send the reply in the suggestion 814 and generate an indication that the reply was sent (e.g., an auditory announcement "REPLY SENT" and/or a visual indication of an animated message envelope being sent).

The interface element 818 indicates "DON'T REPLY" and offers the user the option of not replying to the message 812. If the user touches (e.g., taps) the interface element 818, the computing device 800 will not send a reply to the message 812.

In some embodiments, the computing device 800 can generate the message 812 and/or the suggestion 814 via the audio output component 808. For example, the computing device 800 can generate a synthetic voice that reads the message 812 and/or the suggestion 814 via the audio output component 808. Further, the audio output component 808 can be used to signal (e.g., by a chime or beeping sound) to the user of the computing device 800 that the message 812 was received and/or that the suggestion 814 was generated.

In some embodiments, the computing device 800 can use one or more sensors to monitor the user and receive the user's feedback to perform one or more operations. For example, the computing device 800 can use the imaging component 804 (e.g., a camera) to detect one or more gestures of the user of the computing device 800. If the computing device 800 determines that the user nodded their head, the computing device 800 can determine that the user agrees with the suggestion 814 and would like the suggestion 814 to be implemented. If the computing device 800 determines that the user shakes their head, the computing device 800 can determine that the user disagrees with the suggestion 814 and will not implement the suggestion 814. Further, the computing device 800 can receive user feedback via the audio input component 806 (e.g., a microphone). If the computing device 800 determines that the user has said "SEND REPLY" the computing device 800 can determine that the user agrees with the suggestion 814 and would like the suggestion 814 to be implemented. If the computing device 800 determines that the user has said "DON'T REPLY" the computing device 800 can determine that the user disagrees with the suggestion 814 and will not implement the suggestion 814.

Figure 9:
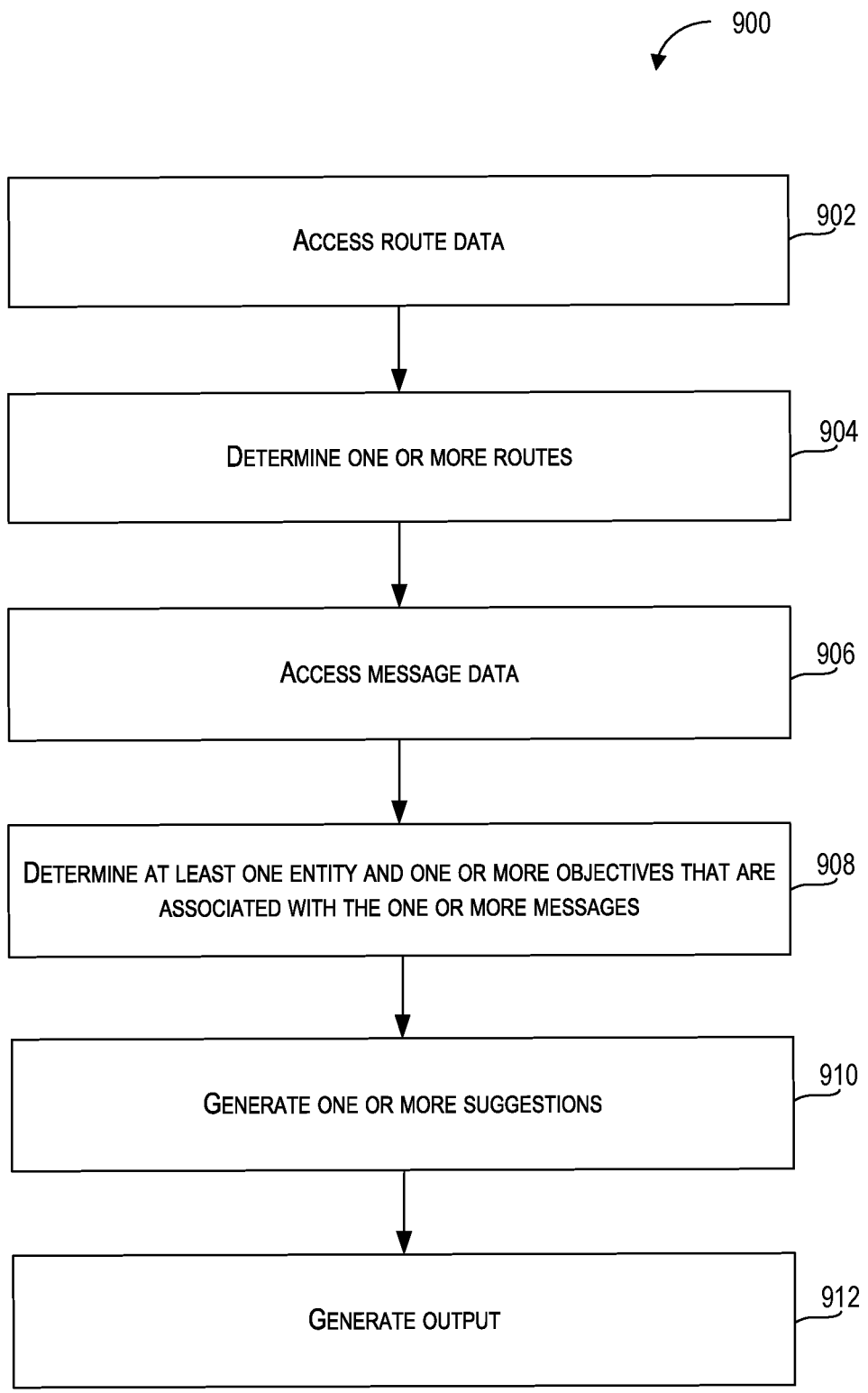
FIG. 9 depicts a flow diagram of message based generation of suggestions for navigation according to example embodiments of the present disclosure.

FIG. 9 depicts a flow diagram of message based generation of suggestions for navigation according to example embodiments of the present disclosure. One or more portions of the method 900 can be executed and/or implemented on one or more computing devices or computing systems including, for example, the computing device 102, the computing system 130, the training computing system 150, and/or the computing device 300. Further, one or more portions of the method 900 can be executed or implemented as an algorithm on the hardware devices or systems disclosed herein. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include accessing route data. The route data can include information associated with navigation from a starting location to a destination. For example, the computing device 102 can access locally stored route data that includes information associated with the a starting location (e.g., the current location (latitude, longitude, and/or altitude) of the computing device 102) and a user selected destination. In some embodiments, one or more portions of the route data can be stored remotely (e.g., on the computing system 130) and the computing device 102 can access the one or more portions of route data based at least in part on one or more requests (e.g., requests associated with a navigation session initiated by the user of a navigation application that runs on the computing device 102) associated with navigation from the starting location to the destination.

At 904, the method 900 can include determining, based at least in part on the route data, one or more routes from the starting location to the destination. For example, the computing device 102 can access map data that includes one or more maps of a geographic area that includes the starting location and the destination. The computing device 102 can then use the map data and a set of constraints (e.g., a maximum travel time or maximum travel distance) to determine the one or more routes from the starting location to the destination by determining a set of one or more roads that can be used to navigate from the starting location to the destination.

At 906, the method 900 can include accessing message data. The message data can include information associated with one or more messages associated with a user (e.g., a user of a computing device that is used for navigation). For example, the computing device 102 can access message data that is transmitted to a messaging application (e.g., an text messaging application) that is operational on the computing device 102.

At 908, the method 900 can include determining, based at least in part on the one or more messages and one or more machine-learned models, at least one entity and/or one or more objectives that are associated with the one or more messages. For example, the computing device 102 can perform one or more operations including using the route data and/or the message data as part of an input to one or more machine-learned models that are configured to receive the input, perform one or more operations on the input, and generate an output including the at least one entity and/or the one or more objectives.

The one or more machine-learned models can be configured and/or trained to analyze and/or parse the message data and/or the one or more messages in order to determine at least one entity associated with the message data (e.g., the sender of the message and/or any individuals mentioned within the message). Further, the one or more machine-learned models can be configured and/or trained to analyze and/or parse the message data to determine one or more objectives that may be present in the one or more messages. For example, the one or more machine-learned models can perform one or more natural language understanding operations to determine and/or extract semantic content from the one or more messages including one or more objectives that may be related to navigation (e.g., adding a waypoint to a route and/or changing a pick-up or drop-off location).

At 910, the method 900 can include generating, based at least in part on the one or more routes, the at least one entity, and the one or more objectives, one or more suggestions associated with the one or more messages. For example, the computing device 102 can perform one or more operations including using the at least one entity and/or the one or more objectives as part of an input to one or more machine-learned models that are configured to receive the input, perform one or more operations on the input, and generate an output including the one or more suggestions. The one or more machine-learned models can be configured and/or trained to analyze at least one entity and/or the one or more objectives in order to generate one or more suggestions (e.g., one or more suggestions that are relevant to the at least one entity and the one or more objectives). Further, the one or more machine-learned models can generate the one or more suggestions based at least in part on the determination and/or extraction of semantic content from the combination of the at least one entity and/or the one or more objectives. For example, the combination of the at least one entity being a family member of the user and the one or more objectives including changing a drop-off location can result in one or more suggestions including accepting an updated route that includes the new drop-off location.

In some embodiments, the one or more suggestions can be generated using one or more heuristics. Further, the computing device 102 can generate one or more suggestions based on parsing identifiable portions of the one or more messages that are associated with common suggestions. For example, if a message from a user's son states: "WHEN WILL YOU GET HERE?" a heuristic can access the route data to determine the estimated time of arrival at the location of the son and generate the suggestion "AT FIVE O'CLOCK" as a suggested reply to send to the son.

At 912, the method 900 can include generating output. The output can be generated via a user interface (e.g., any combination of a graphical user interface that generates the output on a display device and is configured to receive one or more touch inputs from a user and/or a user interface that receives input via one or more microphones and generates output via one or more speakers and/or the display device). The output can include one or more indications that are directed to the user. Further, the one or more indications can be associated with the one or more suggestions. For example, the computing device 102 can include a display component that is used to display the one or more suggestions. Further, the computing device 102 can include an audio output component that can be used to generate the one or more suggestions in an auditory form that the user can listen to without having to look at a display device. For example, a user can hear the one or more suggestions generated by the computing device 102 while driving a vehicle.

Figure 10:
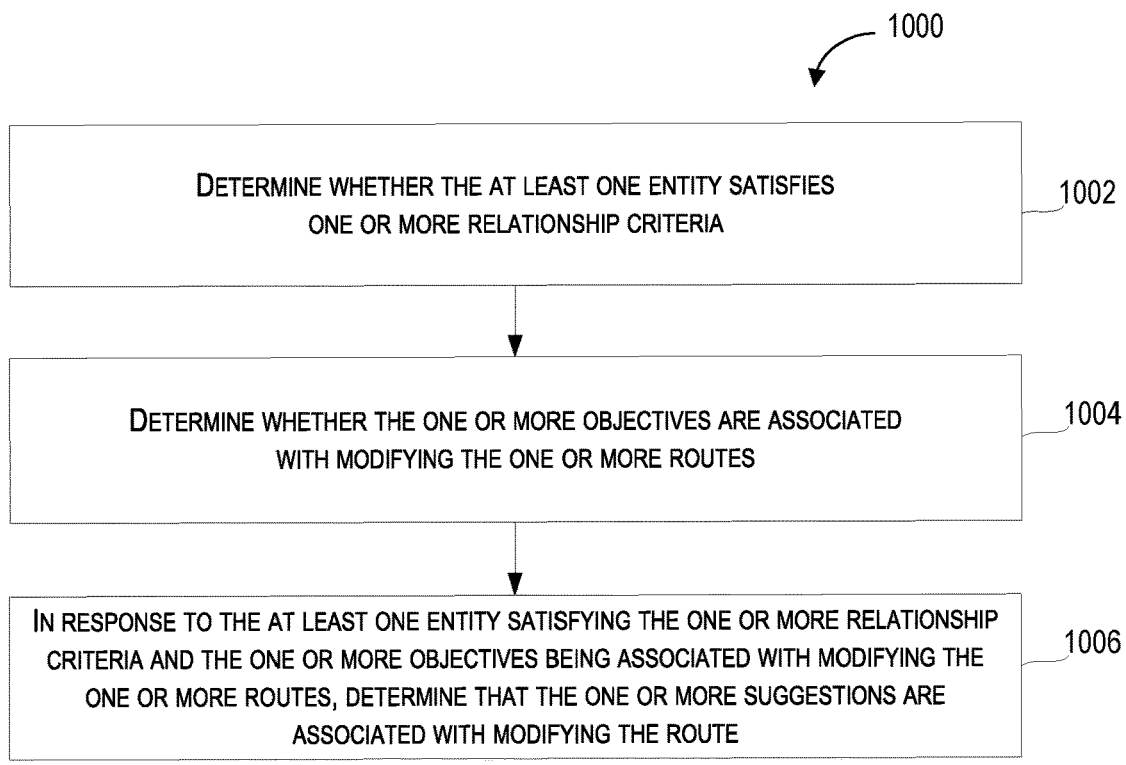
FIG. 10 depicts a flow diagram of message based generation of suggestions for navigation according to example embodiments of the present disclosure.

FIG. 10 depicts a flow diagram of message based generation of suggestions for navigation according to example embodiments of the present disclosure. One or more portions of the method 1000 can be executed and/or implemented on one or more computing devices or computing systems including, for example, the computing device 102, the computing system 130, the training computing system 150, and/or the computing device 300. Further, one or more portions of the method 1000 can be executed or implemented as an algorithm on the hardware devices or systems disclosed herein. In some embodiments, one or more portions of the method 1000 can be performed as part of the method 900 that is depicted in FIG. 9. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining whether (or if) the at least one entity satisfies one or more relationship criteria. For example, the computing device 102 can determine whether the message data includes information associated with the personal identity of the entity that sent the one or more messages associated with the message data. The computing device 102 can then compare the entity to a plurality of entities stored in a listing of entities for whom the user may perform some set of actions including modifying the user's route. If the entity matches at least one of the plurality of entities then the one or more relationship criteria will be satisfied.

At 1004, the method 1000 can include determining whether (or if) the one or more objectives are associated with modifying the one or more routes. For example, the computing device 102 can use one or more machine-learned models to determine if the message data includes one or more objectives associated with modifying the one or more routes. Further, the computing device 102 can determine if the message data includes certain key words or key phrases associated with modifying the one or more routes (e.g., "PICK ME UP HERE INSTEAD").

At 1006, the method 1000 can include, in response to the at least one entity satisfying the one or more relationship criteria and the one or more objectives including the one or more requests to modify the one or more routes, determining that the one or more suggestions are associated with modifying the one or more routes. For example, if the at least one entity is part of the plurality of entities that may trigger the user's performance of some set of actions and the message data is associated with a request to change a pick-up location, then the computing device 102 can determine that the one or more suggestions are associated with modifying the route and can then generate a suggestion selected from the category of one or more suggestions that are associated with modifying the route.

Figure 11:
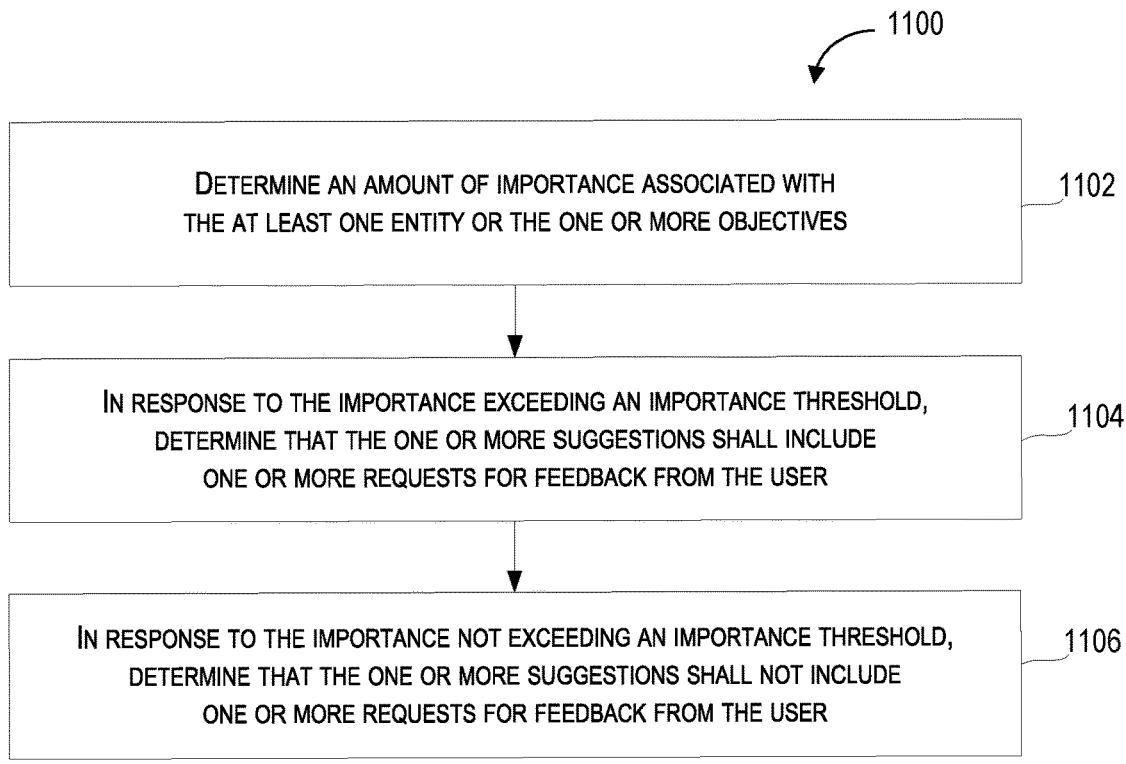
FIG. 11 depicts a flow diagram of message based generation of suggestions for navigation according to example embodiments of the present disclosure.

FIG. 11 depicts a flow diagram of message based generation of suggestions for navigation according to example embodiments of the present disclosure. One or more portions of the method 1100 can be executed and/or implemented on one or more computing devices or computing systems including, for example, the computing device 102, the computing system 130, the training computing system 150, and/or the computing device 300. Further, one or more portions of the method 1100 can be executed or implemented as an algorithm on the hardware devices or systems disclosed herein. In some embodiments, one or more portions of the method 1100 can be performed as part of the method 900 that is depicted in FIG. 9. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include determining a level of importance associated with the at least one entity and/or the one or more objectives. For example, the computing device 102 can determine an objective type of the one or more objectives (e.g., an objective to ask for assistance in an emergency) and compare that objective type to a plurality of objective types (e.g., that are respectively associated with a plurality of importance scores. If some of the one or more objectives matches at least one of the plurality of objective types then the computing device 102 can determine that the level of importance (e.g., high importance for an emergency related objective) of the one or more objectives will match the importance score.

At 1104, the method 1100 can include, in response to the level of importance exceeding an importance threshold, determining that the one or more suggestions shall include one or more requests for feedback from the user. The computing device 102 can determine that if the level of importance is greater than the importance threshold, the one or more suggestions that are generated can include a request (e.g., a request in the form of user interface options to provide feedback) for feedback from the user.

At 1106, the method 1100 can include, in response to the level of importance not exceeding the importance threshold, determining that the one or more suggestions shall not include one or more requests for feedback from the user. The computing device 102 can determine that if the level of importance is less than or equal to the importance threshold, the one or more suggestions that are generated will not include a request for feedback from the user. The one or more suggestions may instead provide the user with information without requesting feedback from the user.

Figure 12:
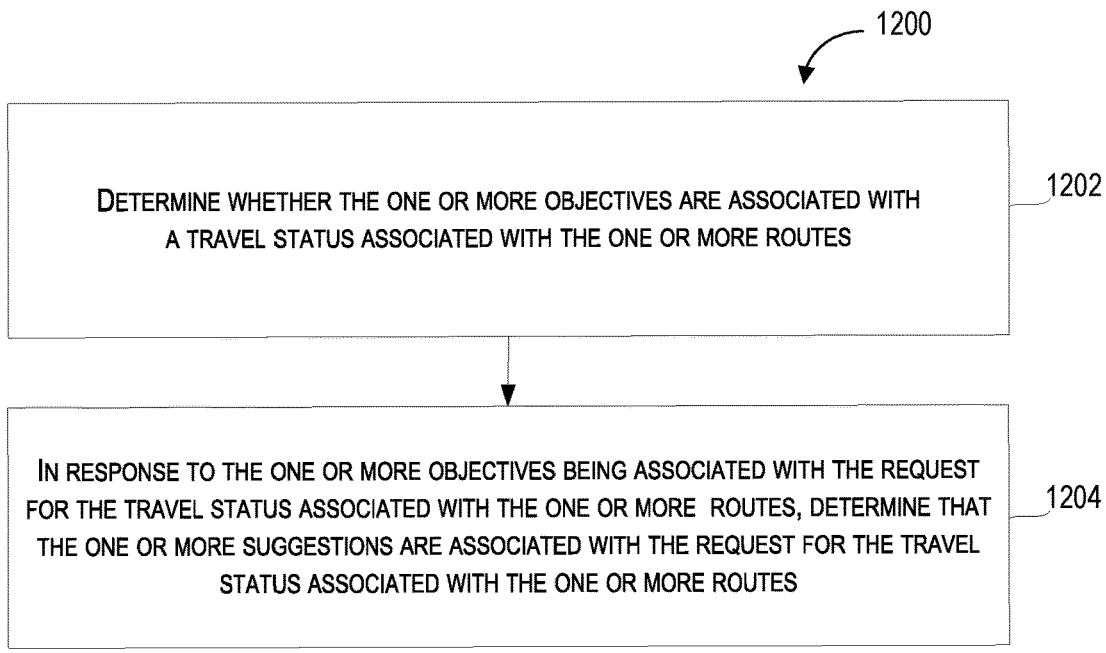
FIG. 12 depicts a flow diagram of message based generation of suggestions for navigation according to example embodiments of the present disclosure.

FIG. 12 depicts a flow diagram of message based generation of suggestions for navigation according to example embodiments of the present disclosure. One or more portions of the method 1200 can be executed and/or implemented on one or more computing devices or computing systems including, for example, the computing device 102, the computing system 130, the training computing system 150, and/or the computing device 300. Further, one or more portions of the method 1200 can be executed or implemented as an algorithm on the hardware devices or systems disclosed herein. In some embodiments, one or more portions of the method 1200 can be performed as part of the method 900 that is depicted in FIG. 9. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include determining whether the one or more objectives are associated with a request for a travel status associated with the one or more routes. For example, the request for the travel status of a route can include a request for an estimated time of arrival at a location along the route. Further, the computing device 102 can provide the one or more objectives as an input to the one or more machine-learned models, which can be configured and/or trained to perform one or more operations on the input and generate an output including a determination of whether the one or more objectives are associated with a request for an estimated time of arrival at a location (e.g., a pick-up location) along the route.

At 1204, the method 1200 can include, in response to the one or more objectives being associated with the request for the travel status associated with the one or more routes, determining that the one or more suggestions are associated with the request for the travel status associated with the one or more routes. For example, in response to computing device 102 determining that the one or more objectives are associated with the request for the travel status associated with the route that includes a request for the estimated time of arrival, the computing device 102 can determine that the one or more suggestions that are generated will be associated with the estimated time of arrival (e.g., the one or more suggestions will provide an estimated time of arrival).

Figure 13:
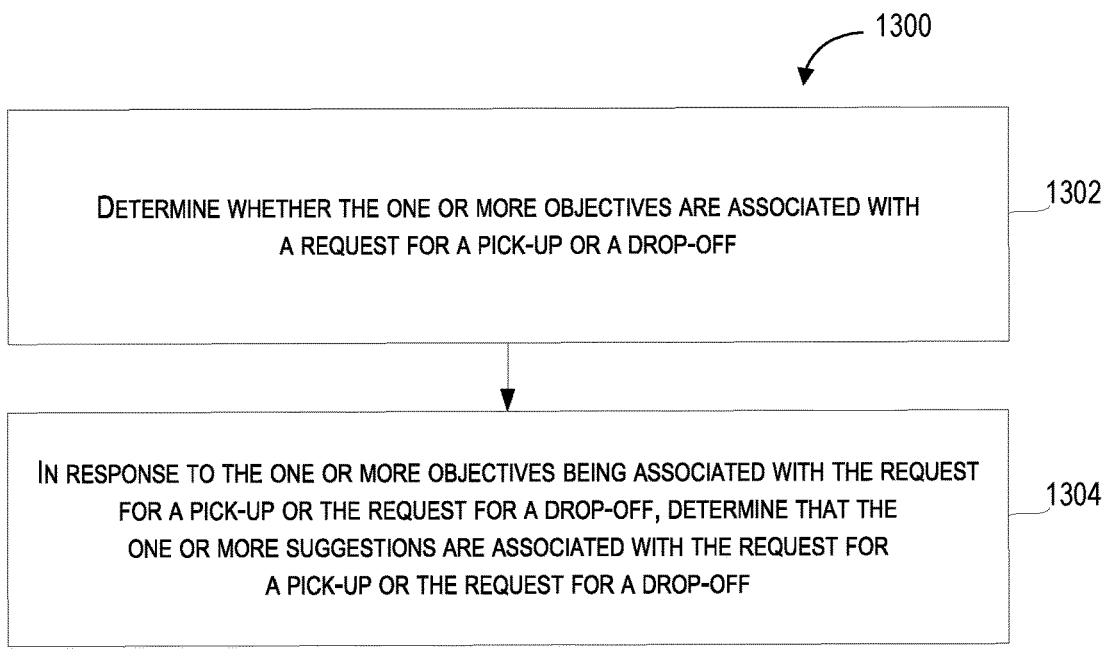
FIG. 13 depicts a flow diagram of message based generation of suggestions for navigation according to example embodiments of the present disclosure.

FIG. 13 depicts a flow diagram of message based generation of suggestions for navigation according to example embodiments of the present disclosure. One or more portions of the method 1300 can be executed and/or implemented on one or more computing devices or computing systems including, for example, the computing device 102, the computing system 130, the training computing system 150, and/or the computing device 300. Further, one or more portions of the method 1300 can be executed or implemented as an algorithm on the hardware devices or systems disclosed herein. In some embodiments, one or more portions of the method 1300 can be performed as part of the method 900 that is depicted in FIG. 9. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include determining whether the one or more objectives are associated with a request for a pick-up and/or a request for a drop-off. For example, the computing device 102 can provide the one or more objectives as an input to the one or more machine-learned models, which can be configured and/or trained to perform one or more operations on the input and generate an output including a determination of whether the one or more objectives are associated with a request for a pick-up and/or a request for a drop-off (e.g., a request to change a pick-up location and/or a request to change a pick-up time).

At 1304, the method 1300 can include, in response to the one or more objectives being associated with the request for a pick-up and/or the request for a drop-off, determining that the one or more suggestions shall be associated with the request for a pick-up or a drop-off. For example, in response to computing device 102 determining that the one or more objectives are associated with the request for whether the sender of the one or more messages will be picked up on time by the user, the computing device 102 can determine that the one or more suggestions that are generated will be associated with confirmation that the user will be at the pick-up location on time.

Figure 14:
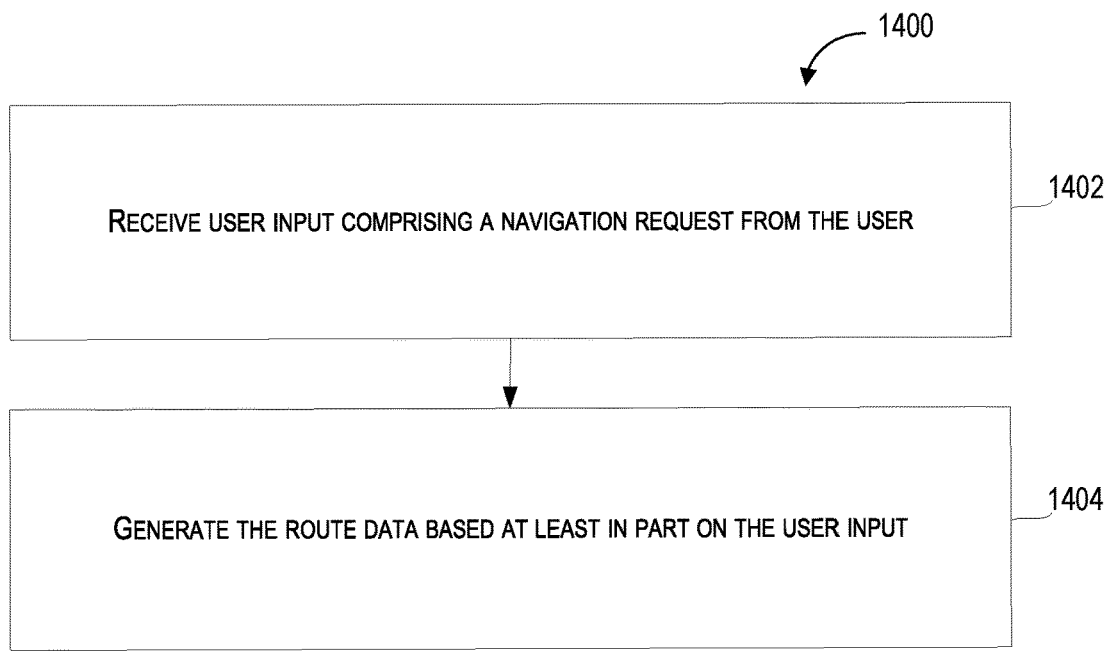
FIG. 14 depicts a flow diagram of message based generation of suggestions for navigation according to example embodiments of the present disclosure.

FIG. 14 depicts a flow diagram of message based generation of suggestions for navigation according to example embodiments of the present disclosure. One or more portions of the method 1400 can be executed and/or implemented on one or more computing devices or computing systems including, for example, the computing device 102, the computing system 130, the training computing system 150, and/or the computing device 300. Further, one or more portions of the method 1400 can be executed or implemented as an algorithm on the hardware devices or systems disclosed herein. In some embodiments, one or more portions of the method 1400 can be performed as part of the method 900 that is depicted in FIG. 9. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include receiving one or more user inputs comprising a navigation request from the user. For example, the computing device 102 can detect when a user provides one or more touch inputs to a tactile user interface of the computing device 102. The computing device 102 can then determine whether the one or more touch inputs are associated with a navigation request (e.g., a request for the computing device 102 to perform one or more operations associated with navigation including generating a route for the user that includes one or more locations).

At 1404, the method 1400 can include generating the route data based at least in part on the navigation request. For example, the computing device 102 can use a location included in the navigation request (e.g., the current location of the computing device 102 or a user selected location) as the starting location and a user selected destination as the destination of the one or more routes. The user computing device 102 can then generate the route data including the starting location and destination from the navigation request and/or modify existing route data to include the route data based at least in part on the navigation request. The route data can then include a route from the current location of the computing device 102 to the destination associated with the navigation request.

Figure 15:
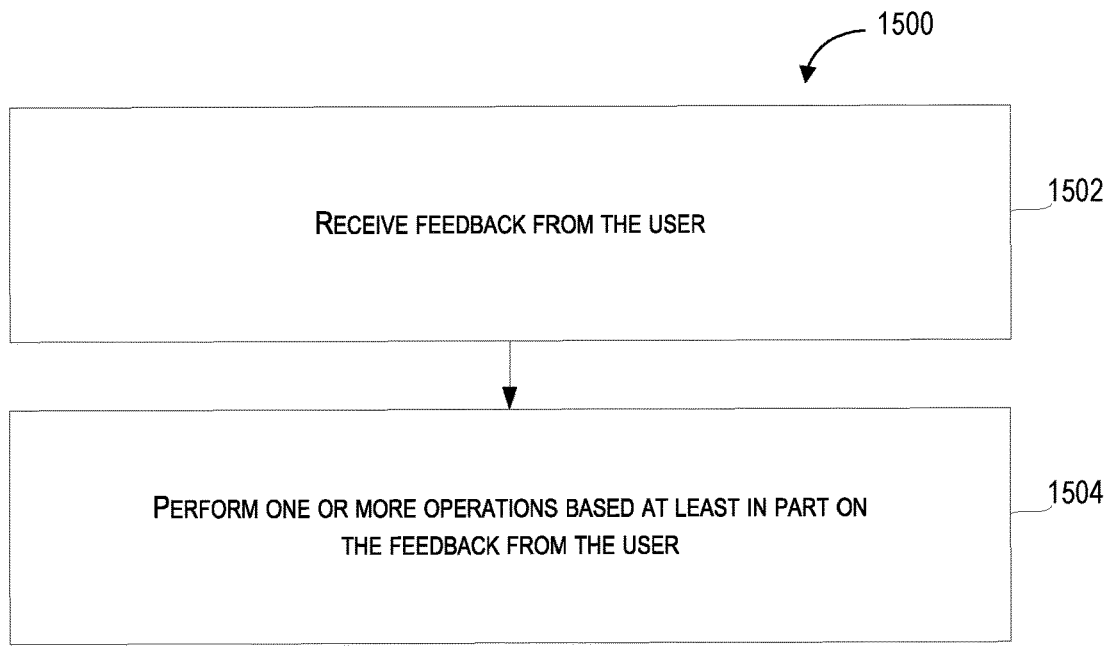
FIG. 15 depicts a flow diagram of message based generation of suggestions for navigation according to example embodiments of the present disclosure.

FIG. 15 depicts a flow diagram of message based generation of suggestions for navigation according to example embodiments of the present disclosure. One or more portions of the method 1500 can be executed and/or implemented on one or more computing devices or computing systems including, for example, the computing device 102, the computing system 130, the training computing system 150, and/or the computing device 300. Further, one or more portions of the method 1500 can be executed or implemented as an algorithm on the hardware devices or systems disclosed herein. In some embodiments, one or more portions of the method 1500 can be performed as part of the method 900 that is depicted in FIG. 9. FIG. 15 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include receiving the feedback from the user. The feedback can be received via a user interface (e.g., a graphical user interface that is displayed on a display component and receives touch inputs from the user and/or an auditory user interface that uses one or more microphones to receive verbal commands from the user). The feedback from the user can be associated with at least one suggested route of the one or more suggested routes. For example, the computing device 102 can generate a suggestion that provides a user with a response to one or more messages that were received and also requesting that the user indicate "REPLY" or "DON'T REPLY" via an interface element of a user interface that is generated on a display component of the computing device 102.

At 1504, the method 1500 can include performing one or more operations based at least in part on the feedback from the user. For example, in response to the computing device 102 receiving feedback indicating that the user agrees with one or more suggestions (e.g., sending a reply to the sender of one or more messages), the computing device 102 can generate a suggested reply and send the suggested reply to the sender of the one or more messages.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of navigation, the computer-implemented method comprising:
   accessing, by a computing system comprising one or more processors, route data comprising information associated with navigation from a starting location to a destination for a vehicle associated with the computing system;

determining, by the computing system, based at least in part on the route data, one or more routes from the starting location to the destination;

accessing, by the computing system, message data comprising one or more messages associated with a user;

determining, by the computing system, based at least in part on the message data and one or more machine-learned models, at least one entity and one or more objectives that are associated with the one or more messages;

providing, for presentation to the user by the computing system, based at least in part on the one or more routes, the at least one entity, and the one or more objectives, one or more suggestions associated with the one or more messages which request feedback from the user associated with potential courses of action relating to the vehicle;

generating, by the computing system, via a user interface, a plurality of outputs directed to the user, wherein
the plurality of outputs are associated with the one or more suggestions which request feedback from the user and are associated with potential courses of action relating to the vehicle, and
the plurality of outputs include a first selectable option comprising a first user interface element provided for presentation on the user interface, the first selectable option being configured to, when selected, provide feedback indicating to maintain a current course of action relating to the vehicle and a second selectable option comprising a second user interface element provided for presentation on the user interface, the second selectable option being configured to, when selected, provide feedback indicating to update the current course of action relating to the vehicle;

based on a selection of one of the first selectable option and the second selectable option, controlling a navigation system of the vehicle;

based on the selection of the first selectable option, automatically generating a first response to a sender of the one or more messages; and based on the selection of the second selectable option, automatically generating a second response to the sender of the one or more messages.

2. The computer-implemented method of claim 1, wherein the generating, by the computing system, based at least in part on the one or more routes, the at least one entity, and the one or more objectives, one or more suggestions associated with the one or more messages comprises:
determining, by the computing system, whether the at least one entity satisfies one or more relationship criteria;
determining, by the computing system, whether the one or more objectives are associated with one or more requests to modify the one or more routes; and
in response to the at least one entity satisfying the one or more relationship criteria and the one or more objectives including the one or more requests to modify the one or more routes, determining, by the computing system, that the one or more suggestions are associated with one or more requests to modify the one or more routes.

3. The computer-implemented method of claim 2, wherein the satisfying the one or more relationship criteria comprises the at least one entity being associated with a high priority relationship group, the at least one entity being an individual that has previously communicated with the user at a frequency that exceeds a communication frequency threshold, the at least one entity being an individual that has previously communicated with the user a total number of times that exceeds a communication quantity threshold, or the at least one entity being an individual that is associated with the one or more routes.

4. The computer-implemented method of claim 2, wherein the one or more requests to modify the one or more routes comprise a request to add at least one waypoint to the one or more routes, a request to modify a pick-up location, a request to modify a pick-up time, a request to modify a drop-off location, a request to modify a drop-off time, or a request to modify a destination of the one or more routes.

5. The computer-implemented method of claim 1, wherein the generating, by the computing system, based at least in part on the one or more routes, the at least one entity, and the one or more objectives, one or more suggestions associated with the one or more messages comprises:
determining, by the computing system, a level of importance associated with the at least one entity or the one or more objectives;
in response to the level of importance exceeding an importance threshold, determining, by the computing system, that the one or more suggestions shall include one or more requests for the feedback from the user; and
in response to the level of importance not exceeding the importance threshold, determining, by the computing system, that the one or more suggestions shall not include one or more requests for the feedback from the user.

6. The computer-implemented method of claim 5, wherein the one or more requests for feedback from the user comprise a request for spoken feedback, a request for haptic feedback, or a request for gesture feedback.

7. The computer-implemented method of claim 1, wherein the generating, by the computing system, based at least in part on the one or more routes, the at least one entity, and the one or more objectives, one or more suggestions associated with the one or more messages comprises:
determining, by the computing system, whether the one or more objectives are associated with a request for a travel status associated with the one or more routes; and
in response to the one or more objectives being associated with the request for the travel status associated with the one or more routes, determining, by the computing system, that the one or more suggestions are associated with the request for the travel status associated with the one or more routes.

8. The computer-implemented method of claim 1, wherein the generating, by the computing system, based at least in part on the one or more routes, the at least one entity, and the one or more objectives, one or more suggestions associated with the one or more messages comprises:
determining, by the computing system, whether the one or more objectives are associated with a request for a pick-up or a request for a drop-off; and
in response to the one or more objectives being associated with the request for a pick-up or the request for a drop-off, determining, by the computing system, that the one or more suggestions shall be associated with the request for a pick-up or a drop-off.

9. The computer-implemented method of claim 1, further comprising:
receiving, by the computing system, one or more user inputs comprising a navigation request from the user; and generating, by the computing system, the route data based at least in part on the navigation request.

10. The computer-implemented method of claim 1, wherein the at least one entity is associated with one or more personal names, one or more geographic locations, one or more occupational titles, or one or more organizational names.

11. The computer-implemented method of claim 1, wherein the one or more suggestions are based at least in part on the one or more machine-learned models.

12. The computer-implemented method of claim 1, wherein the one or more machine-learned models are configured to determine the at least one entity or the one or more objectives based at least in part on one or more natural language processing techniques.

13. The computer-implemented method of claim 1, further comprising:
training the one or more machine-learned models based at least in part on the selection of the one of the first selectable option and the second selectable option.

14. One or more tangible non-transitory computer-readable media storing computer-readable instructions that when executed by one or more processors cause the one or more processors to perform operations, the operations comprising:
accessing, for a vehicle, route data comprising information associated with navigation from a starting location to a destination;
determining, based at least in part on the route data, one or more routes from the starting location to the destination;
accessing message data comprising one or more messages associated with a user;
determining, based at least in part on the message data and one or more machine-learned models, at least one entity and one or more objectives that are associated with the one or more messages;
providing, for presentation to the user, based at least in part on the one or more routes, the at least one entity, and the one or more objectives, one or more suggestions associated with the one or more messages which request feedback from the user and are associated with potential courses of action relating to the vehicle;
generating, via a user interface, a plurality of outputs directed to the user,
wherein
the plurality of outputs are associated with the one or more suggestions which request feedback from the user associated with potential courses of action relating to the vehicle, and
the plurality of outputs include a first selectable option comprising a first user interface element provided for presentation on the user interface, the first selectable option being configured to, when selected, provide feedback indicating to maintain a current course of action relating to the vehicle and a second selectable option comprising a second user interface element provided for presentation on the user interface, the second selectable option being configured to, when selected, provide feedback indicating to update the current course of action relating to the vehicle;
based on a selection of one of the first selectable option and the second selectable option, controlling a navigation system of the vehicle;
based on the selection of the first selectable option, automatically generating a first response to a sender of the one or more messages; and based on the selection of the second selectable option, automatically generating a second response to the sender of the one or more messages.

15. The one or more tangible non-transitory computer-readable media of claim 14, wherein the one or more messages comprise one or more text messages.

16. The one or more tangible non-transitory computer-readable media of claim 14, wherein the one or more suggestions comprise one or more turn-by-turn directions for the user to navigate the one or more routes.

17. A computing system comprising:
one or more processors;
one or more non-transitory computer-readable media storing instructions that when executed by the one or more processors cause the one or more processors to perform operations comprising:
accessing route data comprising information associated with navigation from a starting location to a destination for a vehicle associated with the computing system;
determining, based at least in part on the route data, one or more routes from the starting location to the destination;
accessing message data comprising one or more messages associated with a user;
determining, based at least in part on the message data and one or more machine-learned models, at least one entity and one or more objectives that are associated with the one or more messages;
providing, for presentation to the user, based at least in part on the one or more routes, the at least one entity, and the one or more objectives, one or more suggestions associated with the one or more messages which request feedback from the user associated with potential courses of action relating to the vehicle;
generating, via a user interface, a plurality of outputs directed to the user,
wherein
the plurality of outputs are associated with the one or more suggestions which request feedback from the user and are associated with potential courses of action relating to the vehicle, and
the plurality of outputs include a first selectable option comprising a first user interface element provided for presentation on the user interface, the first selectable option being configured to, when selected, provide feedback indicating to maintain a current course of action relating to the vehicle and a second selectable option comprising a second user interface element provided for presentation on the user interface, the second selectable option being configured to, when selected, provide feedback indicating to update the current course of action relating to the vehicle; and
based on a selection of one of the first selectable option and the second selectable option, controlling a navigation system of the vehicle;
based on the selection of the first selectable option, automatically generating a first response to a sender of the one or more messages; and
based on the selection of the second selectable option, automatically generating a second response to the sender of the one or more messages.

18. The computing system of claim 17, wherein the plurality of outputs comprise one or more visual indications or one or more aural indications.

19. The computing system of claim 17, wherein the one or more machine-learned models are configured to generate output comprising the at least one entity and the one or more objectives based at least in part on input comprising the message data.

\* \* \* \* \*